United States Patent
Cavallaro

(10) Patent No.: US 7,951,015 B2
(45) Date of Patent: May 31, 2011

(54) MULTILAYER GOLF BALL CONTAINING AT LEAST THREE CORE LAYERS, AT LEAST ONE INTERMEDIATE BARRIER LAYER, AND AT LEAST ONE COVER LAYER

(75) Inventor: Christopher Cavallaro, Lakeville, MA (US)

(73) Assignee: Acushnet Company, Fairhaven, MA (US)

( * ) Notice: Subject to any disclaimer, the term of this patent is extended or adjusted under 35 U.S.C. 154(b) by 292 days.

(21) Appl. No.: 11/560,926

(22) Filed: Nov. 17, 2006

(65) Prior Publication Data

US 2007/0129172 A1    Jun. 7, 2007

Related U.S. Application Data

(63) Continuation-in-part of application No. 11/083,453, filed on Mar. 18, 2005, now Pat. No. 7,182,702, which is a continuation of application No. 10/754,781, filed on Jan. 9, 2004, now Pat. No. 6,932,720, which is a continuation of application No. 10/103,414, filed on Mar. 21, 2002, now abandoned, which is a continuation-in-part of application No. 09/973,342, filed on Oct. 9, 2001, now Pat. No. 6,632,147.

(51) Int. Cl.
*A63B 37/06* (2006.01)
(52) U.S. Cl. .................................................. 473/376
(58) Field of Classification Search ............ 473/376, 473/377, 367, 368
See application file for complete search history.

(56) References Cited

U.S. PATENT DOCUMENTS

| | | |
|---|---|---|
| 2,356,128 A | 8/1944 | Thomas et al. |
| 3,099,644 A | 7/1963 | Parker et al. |
| 3,241,834 A | 3/1966 | Stingley |
| 3,313,545 A | 4/1967 | Bartsch |
| 3,502,338 A | 3/1970 | Cox |
| 3,642,728 A | 2/1972 | Canter |
| 3,989,568 A | 11/1976 | Isaac |
| 4,123,061 A | 10/1978 | Dusbiber |
| 4,141,559 A | 2/1979 | Melvin et al. |
| 4,165,425 A | 8/1979 | Bertozzi |
| 4,209,485 A | 6/1980 | Greespan |
| 4,229,337 A | 10/1980 | Brenner |
| 4,234,705 A | 11/1980 | Matoba |
| 4,239,799 A | 12/1980 | Weinberg et al. |
| 4,250,273 A | 2/1981 | Boehm et al. |
| 4,263,078 A | 4/1981 | Millen et al. |
| 4,265,976 A | 5/1981 | Nowark |
| 4,356,676 A | 11/1982 | Hauptman |
| 4,593,062 A | 6/1986 | Puydak et al. |
| 4,650,193 A | 3/1987 | Molitor et al. |
| 4,863,167 A | 9/1989 | Matsuki et al. |

(Continued)

FOREIGN PATENT DOCUMENTS

GB    2280379 A    2/1995

(Continued)

*Primary Examiner* — Raeann Trimiew
(74) *Attorney, Agent, or Firm* — Margaret C. Barker

(57) ABSTRACT

The present invention is directed to multi-layer golf balls having at least three core layers, at least one cover layer, and at least one intermediate layer between the core and the cover layer that acts as a vapor barrier. Advantageously, the at least three core layers have a hardness gradient that either increases or decreases toward the at least one intermediate vapor barrier layer.

10 Claims, 2 Drawing Sheets

U.S. PATENT DOCUMENTS

| | | |
|---|---|---|
| 4,995,613 A | 2/1991 | Walker |
| 5,162,445 A | 11/1992 | Powers et al. |
| 5,184,828 A | 2/1993 | Kim et al. |
| 5,334,673 A | 8/1994 | Wu |
| 5,468,527 A | 11/1995 | Peiffer et al. |
| 5,506,014 A | 4/1996 | Minnick |
| 5,605,512 A | 2/1997 | Yamada et al. |
| 5,672,393 A | 9/1997 | Bachmann et al. |
| 5,677,362 A | 10/1997 | Bachmann et al. |
| 5,685,785 A | 11/1997 | Kakiuchi et al. |
| 5,755,628 A | 5/1998 | Kakiuchi et al. |
| 5,772,531 A * | 6/1998 | Ohsumi et al. ................ 473/376 |
| 5,779,562 A | 7/1998 | Melvin et al. |
| 5,820,488 A * | 10/1998 | Sullivan et al. ............... 473/374 |
| 5,873,796 A | 2/1999 | Cavallaro et al. |
| 5,875,891 A | 3/1999 | Snell |
| 5,882,567 A | 3/1999 | Cavallaro et al. |
| 5,885,172 A | 3/1999 | Hebert et al. |
| 5,908,358 A | 6/1999 | Wu |
| 5,919,100 A | 7/1999 | Boehm et al. |
| 5,965,669 A | 10/1999 | Cavallaro et al. |
| 5,981,654 A | 11/1999 | Rajagopalan |
| 5,984,806 A | 11/1999 | Sullivan et al. |
| 6,010,412 A | 1/2000 | Moriyama |
| 6,015,356 A * | 1/2000 | Sullivan et al. ............... 473/373 |
| 6,030,296 A | 2/2000 | Morgan et al. |
| 6,045,460 A | 4/2000 | Hayashi et al. |
| 6,062,283 A | 5/2000 | Watanabe et al. |
| 6,066,054 A | 5/2000 | Masutani |
| 6,106,415 A | 8/2000 | Masutani et al. |
| 6,113,505 A | 9/2000 | Boehm |
| 6,117,024 A | 9/2000 | Dewanjee |
| 6,123,628 A | 9/2000 | Ichikawa et al. |
| 6,126,558 A | 10/2000 | Higuchi et al. |
| 6,132,324 A | 10/2000 | Hebert et al. |
| 6,135,898 A | 10/2000 | Higuchi et al. |
| 6,142,888 A | 11/2000 | Higuchi et al. |
| 6,174,388 B1 | 1/2001 | Sikka et al. |
| 6,180,715 B1 | 1/2001 | Schmidt |
| 6,200,511 B1 | 3/2001 | Peiffer et al. |
| 6,232,389 B1 | 5/2001 | Feeney et al. |
| 6,334,919 B1 | 1/2002 | Takeyama et al. |
| 6,342,567 B2 | 1/2002 | Minagawa et al. |
| 6,346,571 B1 | 2/2002 | Dharmarajan et al. |
| 6,354,965 B1 | 3/2002 | Harris et al. |
| 6,398,668 B1 | 6/2002 | Wai |
| 6,494,793 B1 | 12/2002 | Ohama |
| 6,494,794 B1 | 12/2002 | Ohama |
| 6,632,147 B2 * | 10/2003 | Cavallaro et al. ............. 473/374 |
| 6,632,148 B2 | 10/2003 | Hayashi et al. |
| 6,855,070 B2 | 2/2005 | Hogge et al. |
| 6,932,720 B2 | 8/2005 | Hogge et al. |
| 6,949,595 B2 | 9/2005 | Morgan et al. |
| 7,066,843 B2 | 6/2006 | Kennedy, III et al. |
| 7,070,726 B2 | 7/2006 | Tzivanis et al. |
| 2003/0114247 A1* | 6/2003 | Cavallaro et al. ............. 473/357 |
| 2003/0148827 A1* | 8/2003 | Sullivan et al. ............... 473/371 |
| 2003/0209840 A1 | 11/2003 | Hogge et al. |
| 2004/0209707 A1* | 10/2004 | Sullivan et al. ............... 473/371 |
| 2005/0164810 A1 | 7/2005 | Hogge et al. |

FOREIGN PATENT DOCUMENTS

| | | |
|---|---|---|
| WO | WO 00/23519 | 4/2000 |
| WO | WO 01/29129 | 4/2001 |

* cited by examiner

MULTILAYER GOLF BALL CONTAINING AT LEAST THREE CORE LAYERS, AT LEAST ONE INTERMEDIATE BARRIER LAYER, AND AT LEAST ONE COVER LAYER

CROSS-REFERENCE TO RELATED PATENT APPLICATIONS

This non-provisional utility patent application is a continuation-in-part of U.S. patent application Ser. No. 11/083,453 filed Mar. 18, 2005, now issued as U.S. Pat. No. 7,182,702, which is a continuation of U.S. patent application Ser. No. 10/754,781, filed Jan. 9, 2004, 2004, now issued as U.S. Pat. No. 6,932,720, which is a continuation of U.S. patent application Ser. No. 10/103,414, filed Mar. 21, 2002, now abandoned, which is a continuation-in-part of U.S. patent application Ser. No. 09/973,342, filed on Oct. 9, 2001, now issued as U.S. Pat. No. 6,632,147. The parent applications and patents are hereby incorporated by reference in their entirety.

FIELD OF THE INVENTION

This invention is related to multi-layer golf balls having a hardness gradient that changes across the at least three layers of the core.

BACKGROUND OF THE INVENTION

Solid core golf balls are well known in the art. Typically, the core is made from polybutadiene rubber material, which provides the primary source of resiliency for the golf ball. U.S. Pat. Nos. 3,241,834 and 3,313,545 disclose the early work in polybutadiene chemistry. It is also known in the art that increasing the cross-link density of polybutadiene can increase the resiliency of the core. The core is typically protected by a cover from repeated impacts from golf clubs. The golf ball may comprise additional layers, which can be an outer core or an inner cover layer. One or more of these additional layers may be a wound layer of stretched elastic windings to increase the ball's resiliency.

A known drawback of polybutadiene cores cross-linked with peroxide and/or zinc diacrylate is that this material is adversely affected by moisture. Water moisture vapor reduces the resiliency of the cores and degrades its properties. A polybutadiene core will absorb water and loose its resilience. Thus, these cores must be covered quickly to maintain optimum ball properties. The cover is typically made from ionomer resins, balata, and urethane, among other materials. The ionomer covers, particularly the harder ionomers, offer some protection against the penetration of water vapor. However, it is more difficult to control or impart spin to balls with hard covers. Conventional urethane covers, on the other hand, while providing better ball control, offer less resistance to water vapor than ionomer covers.

Prolonged exposure to high humidity and elevated temperature may be sufficient to allow water vapor to invade the cores of some commercially available golf balls. For example, at 110° F. and 90% humidity for a sixty day period, significant amounts of moisture enter the cores and reduce the initial velocity of the balls by 1.8 ft/s to 4.0 ft/s or greater. The change in compression may vary from 5 PGA to about 10 PGA or greater. The absorbed water vapor also reduces the coefficient of restitution (CoR) of the ball.

Several prior patents have addressed the water vapor absorption problem. U.S. Pat. No. 5,820,488 discloses a golf ball with a solid inner core, an outer core and a water vapor barrier layer disposed therebetween. The water vapor barrier layer preferably has a water vapor transmission rate lower than that of the cover layer. The water vapor barrier layer can be a polyvinylidene chloride (PVDC) layer. It can also be formed by an in situ reaction between a barrier-forming material and the outer surface of the core. Alternatively, the water vapor barrier layer can be a vermiculite layer. U.S. Pat. Nos. 5,885,172 and 6,132,324 disclose, among other things, a golf ball with a polybutadiene or wound core with an ionomer resin inner cover and a relatively soft outer cover. The hard ionomer inner cover offers some resistance to water vapor penetration and the soft outer cover provides the desirable ball control. Additionally, U.S. Pat. No. 5,875,891 discloses an impermeable packaging for golf balls. The impermeable packaging acts as a moisture barrier to limit moisture absorption by golf balls during storage, but not during use.

The moisture vapor barrier layer disclosed in the prior patents can be rigid and makes the ball stiffer. Furthermore, producing a rigid layer may cause significant production obstacles. On the other hand, less rigid polymers, such as butyl rubber and other rubbers, are known to have low permeability to air, gases and moisture. Butyl rubber is widely used as sealant for rooftops, as inner liner in tubeless tires, and as lining for chemical tanks, among other uses. In the golf ball art, butyl rubber's usage has been limited to practice balls or driving range balls due to its slow initial velocity and low CoR, as discussed in U.S. Pat. Nos. 5,209,485 and 4,995,613. Butyl rubber is also used as the outermost cover layer or a part of the cover due to its durability, as disclosed in U.S. Pat. Nos. 5,873,796 and 5,882,567, among others. However, the moisture vapor barrier advantage of butyl rubber has not heretofore been utilized in the golf ball art to make a better performing golf ball.

Also, high-temperature curing of certain polymeric materials to form the water vapor barrier layer or other outer layers on the golf ball can be difficult to accomplish, since such curing or crosslinking heats the entire golf ball subassembly. This heating method may degrade the untargeted components within the subassembly. Additionally, this curing method limits suitable outer layer materials to materials having a cured temperature that is lower than the softening temperature or lower melting temperature of the inner layers or core.

Hence, there remains a need for a golf ball with an improved water vapor barrier layer and having varying hardness within the core of the golf ball.

SUMMARY OF THE INVENTION

The present invention relates to a multilayer golf ball comprising a core comprising at least three core layers comprising a center, an inner core layer, and an outer core layer, at least one cover layer; and at least one moisture vapor barrier layer comprising a locally curable material intermediate between the outer core layer and the at least one cover layer and exhibiting a moisture vapor transmission rate less than that of the cover layer wherein the center, the inner core layer, and the outer core layer exhibit a hardness gradient. In one embodiment, the moisture vapor barrier layer is formed from a composition comprising an elastomer and a double bond vulcanizable rubber wherein the composition is cured by infrared radiation such that the properties of the core remain unchanged after curing of the moisture barrier layer. In another embodiment, the moisture barrier layer is formed from butyl rubber. In yet another embodiment, the composition comprises an elastomeric homopolymer or copolymer of isobutylene and isoprene wherein the composition is cured by infrared radiation such that the properties of the core remain unchanged after curing of the moisture barrier layer. In still another embodiment, the moisture barrier layer is formed from a composition comprising a homopolymer or copolymer that comprises from about 70% to about 95% by weight of an iso-olefin having from about 4 to about 7 carbon atoms, about 0.5% to about 30% by weight of a conjugated multi-olefin having from about 4 to about 14 carbon atoms, or a combination of the iso-olefin and the conjugated multi-olefin, and wherein the composition is cured by infra red radiation and wherein the materials comprising the moisture vapor barrier layer have higher cured temperatures than the softening temperatures of the materials comprising the core.

The moisture barrier layer is curable onto the core or core assembly locally, without penetrating the underlying golf ball core and/or encased layers and affecting those layers by the heating/curing of the moisture barrier layer.

The hardness gradient increases toward the at least one intermediate vapor barrier layer. In one embodiment, the center hardness is no more than about 50 Shore C, the inner core hardness is greater than about 50 Shore C, the outer core hardness is greater than about 65 Shore C, or a combination thereof. In another embodiment, the hardness gradient decreases toward the at least one intermediate vapor barrier layer. In yet another embodiment, the center hardness is no greater than about 60 Shore C, the inner core hardness is less than about 60 Shore C, the outer core hardness is less than about 50 Shore C, or a combination thereof.

In one embodiment, the center has a diameter of from about 0.5 inch to about 1.6 inches, a Mooney viscosity greater than about 35, a deflection under a load of about 100 kg of at least about 1 mm, a zinc diacrylate content from about 10 to about 40 parts per hundred parts of rubber, or some combination thereof. The inner core layer has an outer diameter of not more than about 1.610 inches, a Mooney viscosity greater than about 35, a zinc diacrylate content from about 15 to about 45 parts per hundred parts of rubber, or some combination thereof. And the outer core layer has an outer diameter of not more than about 1.660 inches, a Mooney viscosity greater than about 35, a zinc diacrylate content from about 15 to about 45 parts per hundred parts of rubber, or some combination thereof.

In one embodiment, the thickness of the at least one vapor barrier layer is relatively uniform and is not more than about 0.020 inch. In another embodiment, the at least one vapor barrier layer comprises a thermoplastic elastomeric binder and a particulate material that has a low moisture vapor transmission rate. The thermoplastic elastomeric binder comprises a styrene-diene block copolymer or a styrene-hydrogenated diene block copolymer. The particulate material comprises an aluminum flake material. The ratio of particulate material to binder material is about 1:1.

The at least one cover layer may comprise a thermoset or thermoplastic polyurethane or polyurea having a hardness of from about 25 to about 65 Shore D and exhibiting a flexural modulus of at least about 2,000 psi.

Additionally, the multilayer golf ball may exhibit at least one of the following: an Atti compression of less than about 110; a coefficient of restitution of at least about 0.790; a deflection under a load of about 100 kg of at least about 1.5 mm; a cover surface having from about 250 to about 450 dimples; or a combination thereof.

The hardness gradient can be increasing from the center or decreasing from the center.

BRIEF DESCRIPTION OF THE DRAWINGS

In the accompanying drawings which form a part of the specification and are to be read in conjunction therewith and in which like reference numerals are used to indicate like parts in the various views.

DETAILED DESCRIPTION OF THE INVENTION

The present invention is directed to multi-layer golf balls having at least three core layers, at least one cover layer, and at least one intermediate layer between the core and the cover layer that acts as a vapor barrier. As used herein, a golf ball subassembly comprises at least the inner core, may further comprise one or more outer core layer, intermediate layer and the outer cover. A subassembly of any layer refers to said layer plus all the inner layers that are underneath said layer.

Figure 1:
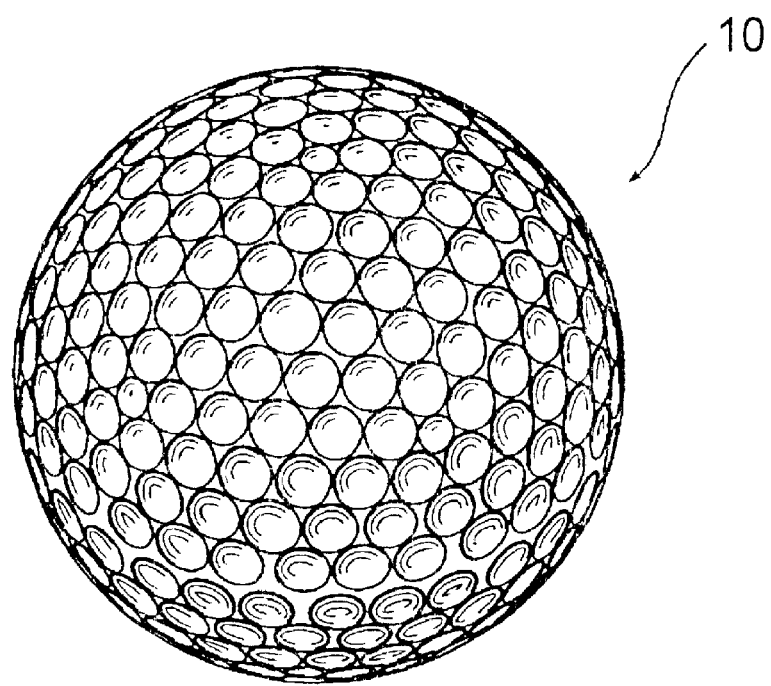
FIG. 1 is a front view of a dimpled golf ball in accordance to the present invention.
Figure 2:
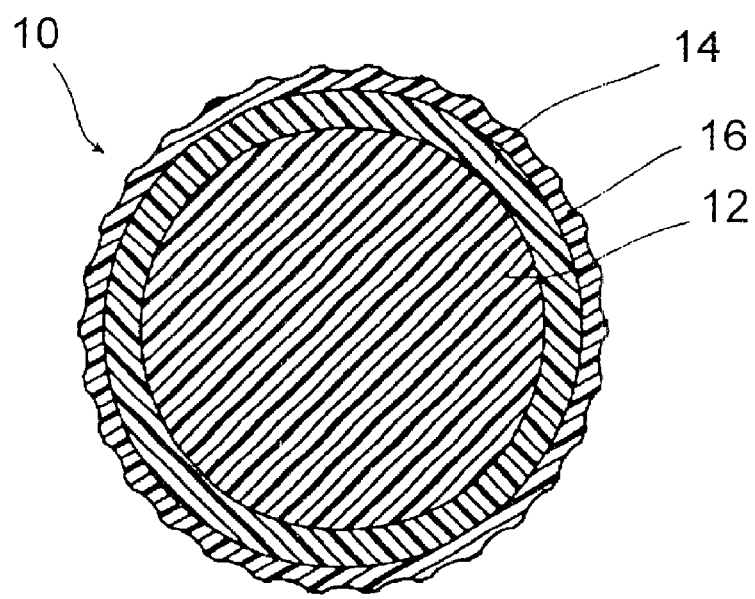
FIG. 2 is a cross-sectional view of the golf ball in FIG. 1 showing a solid core surrounded by a thin moisture vapor barrier layer and a cover.

As shown generally in FIGS. 1 and 2, where like numbers designate like parts, reference number 10 broadly designates a golf ball in accordance to the present invention. Golf ball 10 preferably has a solid core 12, an intermediate layer 14 and a cover 16. Solid core 12 comprises an innermost spherical element, and may comprise at least two additional core layers surrounding the spherical element. Solid core 12 can be made from any suitable core materials including thermoset plastics, such as natural rubber, polybutadiene (PBD), polyisoprene, styrene-butadiene or styrene-propylene-diene rubber, and thermoplastics such as ionomer resins, polyamides, polyesters, or a thermoplastic elastomer. Suitable thermoplastic elastomers include Pebax®, which is believed to comprise polyether amide copolymers, Hytrel®, which is believed to comprise polyether ester copolymers, thermoplastic urethane, and Kraton®, which is believed to comprise styrenic block copolymers elastomers. These products are commercially available from Elf-Atochem, E.I. Du Pont de Nemours and Company, various manufacturers, and Shell Chemical Company, respectively. The core materials can also be formed from a castable material. Suitable castable materials include those comprising a urethane, polyurea, epoxy, silicone, IPNs, etc.

Additionally, suitable core materials may also include a reaction injection molded polyurethane or polyurea, including those versions referred to as nucleated, where a gas, typically nitrogen, is incorporated via intensive agitation or mixing into at least one component of the polyurethane, typically, the pre-polymer, prior to component injection into a closed mold where essentially full reaction takes place resulting in a cured polymer having reduced specific gravity. These materials are referred to as reaction injection molded (RIM) materials.

Figure 3:
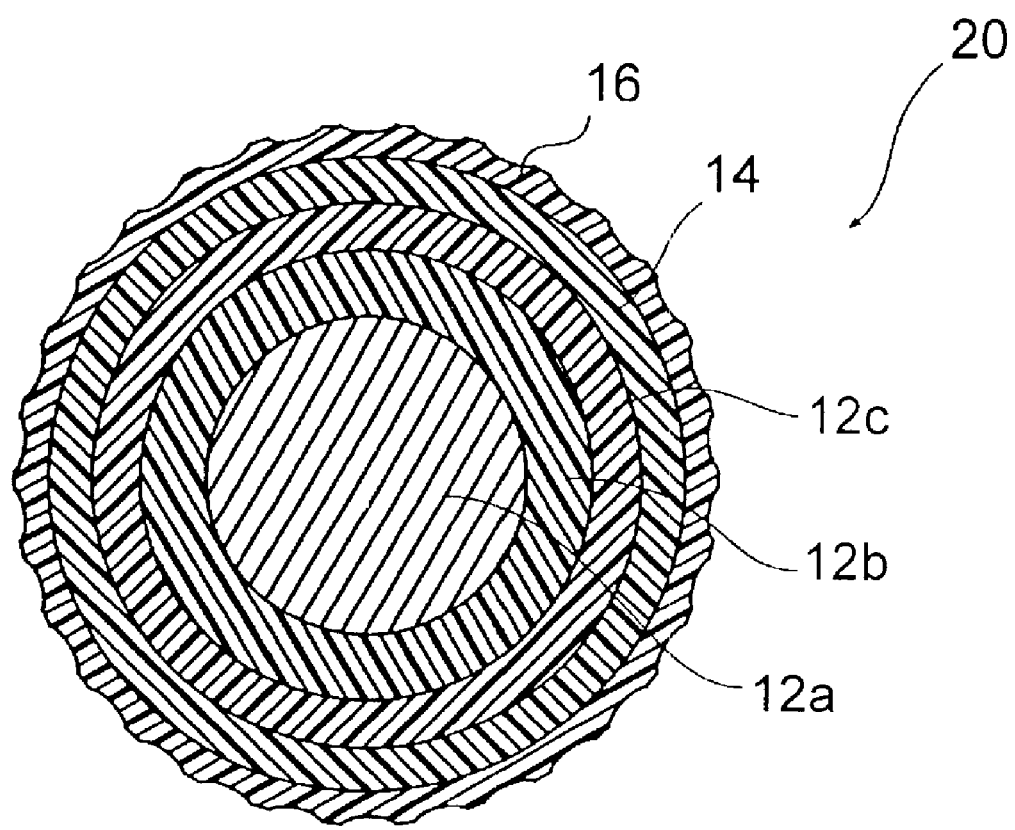
FIG. 3 is a cross-sectional view of another golf ball in accordance to the present invention showing a solid core with multiple layers surrounded by a thin moisture vapor barrier layer.

When core 12 contains multiple layers, e.g., as in FIG. 3, it is preferable for the multiple layers to have a gradient in physical/mechanical properties, such as hardness, that increases from outermost to innermost layer or that decreases from outermost to innermost layer. Property gradients are discussed in more detail below.

Cover 16 is preferably tough, cut-resistant, and selected from conventional materials used as golf ball covers based on the desired performance characteristics. The cover may comprise one or more layers. Suitable cover materials include ionomer resins, such as Surlyn® available from DuPont, blends of ionomer resins, thermoplastic or thermoset urethane, acrylic acid, methacrylic acid, thermoplastic rubber polymers consisting of block copolymers in which the elastomeric midblock of the molecule is an unsaturated rubber or a saturated olefin rubber, e.g., Kraton® rubbers available from Shell Chemical Co., polyethylene, and synthetic or natural vulcanized rubber such as balata.

Additionally, other suitable core and cover materials are disclosed in U.S. Pat. No. 5,919,100 and International Publication Nos. WO 00/23519 and WO 01/29129. These disclosures are incorporated by reference in their entirety. Preferably, core 12 is made from a polybutadiene rubber material, and cover 16 is made from a composition comprising a thermoset or thermoplastic urethane or a composition comprising an ionomer resin.

To prevent or minimize the penetration of moisture, typically water vapor, into core 12 of golf ball 10, intermediate layer 14 comprises a moisture vapor barrier layer preferably disposed around core 12. Preferably, moisture vapor barrier layer 14 has a moisture vapor transmission rate that is lower than that of the cover, and more preferably less than the moisture vapor transmission rate of an ionomer resin such as Surlyn®, which is in the range of about 0.45 to about 0.95 grams·mm/m$^2$·day. Typically, the moisture vapor transmission rate of ionomer resin is less than 0.6 grams·mm/m$^2$·day as reported in "Permeability and other Film Properties of Plastics and Elastomer," published by the Plastic Design Library (1995). The moisture vapor transmission rate is defined as the mass of moisture vapor that diffuses into a material of a given thickness per unit area per unit time. The preferred standards of measuring the moisture vapor transmission rate include ASTM F1249-90, entitled "Standard Test Method for Water Vapor Transmission Rate Through Plastic Film and Sheeting Using a Modulated Infrared Sensor," and ASTM F372-94, entitled "Standard Test Method for Water Vapor Transmission Rate of Flexible Barrier Materials Using an Infrared Detection Technique," among others.

A preferred polymer for the moisture vapor barrier layer is butyl rubber. Butyl rubber (IIR) is an elastomeric copolymer of isobutylene and isoprene. Detailed discussions of butyl rubber are provided in U.S. Pat. Nos. 3,642,728, 2,356,128 and 3,099,644. The disclosures of these references are incorporated herein by reference in their entireties. Butyl rubber is an amorphous, non-polar polymer with good oxidative and thermal stability, good permanent flexibility and high moisture and gas resistance. Generally, butyl rubber includes copolymers of about 70% to 99.5% by weight of an isoolefin, which has about 4 to 7 carbon atoms, e.g., isobutylene, and about 0.5% to 30% by weight of a conjugated multiolefin, which has about 4 to 14 carbon atoms, e.g., isoprene. The resulting copolymer contains about 85% to about 99.8% by weight of combined isoolefin and 0.2% to 15% of combined multiolefin. Commercially available butyl rubbers, such as those manufactured by ExxonMobil Chemical Company, typically have about 1 to about 2.5 mole percent of isoprene. Butyl rubbers generally have molecular weight of about 20,000 to about 500,000. Suitable butyl rubber is also available from United Coatings under the tradename Elastron™ 858, which is a butyl rubber coating applied as a solution in a volatile hydrocarbon solvent, which is typically sprayed or dipped on to an object or a surface, and which contains lead peroxide as a crosslinking agent.

Butyl rubbers are also available in halogenated form. Halogenated butyl rubbers may be prepared by halogenating butyl rubber in a solution containing inert $C_5$-$C_7$ hydrocarbon solvent, such as pentane, hexane, or heptane, and contacting this solution with a halogen gas for a predetermined amount of time, whereby halogenated butyl rubber and a hydrogen halide are formed. The halogenated butyl rubber copolymer may contain up to one halogen atom per double bond. Halogenated butyl rubbers or halobutyl rubbers include bromobutyl rubber, which may contain up to 3% reactive bromine, and chlorobutyl rubber, which may contain up to 3% reactive chlorine. Halogenated butyl rubbers are also available from ExxonMobil Chemical. Butyl rubbers and halogenated rubbers advantageously have low permeability to air, gases, and moisture. For example, as reported by the manufacturer the permeability of nitrogen in butyl rubber is more than one order of magnitude less than that in neoprene, styrene butadiene rubber, natural rubber, and nitrile butadiene rubber.

Butyl rubber is also available in sulfonated form, such as those disclosed in the '728 patent and in U.S. Pat. No. 4,229,337. Generally, butyl rubber having a viscosity average molecular weight in the range of about 5,000 to about 85,000 and a mole percent unsaturation of about 3% to about 4% may be sulfonated with a sulfonating agent comprising a sulfur trioxide ($SO_3$) donor in combination with a Lewis base containing oxygen, nitrogen, or phosphorus. The Lewis base serves as a complexing agent for the $SO_3$ donor. $SO_3$ donors include compounds containing available $SO_3$, such as chlorosulfonic acid, fluorosulfonic acid, sulfuric acid, and oleum.

Typically, the moisture vapor transmission rate of butyl rubber is in the range from about 0.001 to about 0.100 grams·mm/m$^2$·day.

Other suitable moisture vapor barrier polymers include the elastomers that combine the low permeability of butyl rubbers with the environmental and aging resistance of ethylene propylene diene monomer rubbers (EPDM), commercially available as Exxpro™ from ExxonMobil Chemical. More specifically, these elastomers are brominated polymers derived from a copolymer of isobutylene (IB) and p-methylstyrene (PMS). Bromination selectively occurs on the PMS methyl group to provide reactive benzylic bromine functionality. Another suitable moisture vapor barrier polymer is copolymer of isobulyline and isoprene with a styrene block copolymer branching agent to improve manufacturing processability.

Another suitable moisture vapor barrier polymer is polyisobutylene. Polyisobutylne is a homopolymer, which is produced by cationic polymerization methods. Commercially available grades of polyisobutylene, sold under the tradename Vistanex™ also from ExxonMobil Chemical, are highly paraffinic hydrocarbon polymers composed on long straight chain molecules containing only chain-end olefinic bonds. An advantage of such elastomers is the combination of low permeability and chemical inertness to resist moisture vapor encroachment, and chemical or oxidative attacks. Polyisobutylene is available as a viscous liquid or semi-solids, and can be dissolved in certain hydrocarbon solvents.

In accordance to another aspect of the invention, halogenated butyl rubber can be blended with a second rubber, preferably a double bond-vulcanizable rubber, in a specific mixing ratio in a two-step kneading process and then cured to form a rubber blend that has low air/vapor permeability and high adhesion to diene rubbers. A clear advantage of this rubber blend is that it provides enhanced adherence to a polybutadiene core or subassembly to provide an enhanced moisture/water vapor barrier layer. This rubber blend is discussed in U.S. Pat. No. 6,342,567 B2. The '567 patent is hereby incorporated herein by reference. Alternatively, a brominated isobutylene/p-methylstyrene, discussed above, can be used in place of the halogenated rubber. Other moisture vapor barrier polymers include thermoplastic elastomer blends that may be dynamically vulcanized and comprise a butyl rubber or a halogenated butyl rubber, such as those discussed in U.S. Pat. Nos. 6,062,283, 6,334,919 B1, and 6,346,571 B1. These references are incorporated herein by reference. Alternatively, butyl rubber may be blended with a vinylidene chloride polymer or copolymer, e.g., Saran®, as disclosed in U.S. Pat. No. 4,239,799. The 799 patent is also incorporated herein by reference.

Butyl rubbers can be cured by a number of curing agents. Preferred curing agents for golf ball usage include sulfur for butyl rubber, and a peroxide curing agent, preferably zinc oxide, for halogenated butyl rubbers. Other suitable curing agents may include antimony oxide, lead oxide, or lead peroxide. Lead based curing agents may be used when appropriate safety precautions are implemented. Butyl rubbers are commercially available in various grades from viscous liquid to solids with varying the degree of unsaturation and molecular weights. Latex grades are also available.

Butyl rubber and halogenated rubber can be processed by milling, calendering, extruding, injection molding, and compression molding, among other techniques. These processing techniques can produce a semi-cured sheets or half-shelves of the moisture vapor barrier material, which can be wrapped around a core or a core subassembly. The moisture vapor barrier can be fully cured by exposure to heat at elevated temperatures typically in the range of about 250° F. to about 2000° F.

Additionally, any number of fillers, additives, fibers and flakes, such as mica, micaceous iron oxide, metal, ceramic, graphite, aluminum, or more preferably leafing aluminum, can be incorporated into the moisture vapor barrier layer to create a physical barrier, i.e., a more tortuous path, against moisture vapor encroachment.

In accordance to another aspect of the invention, the curing of the moisture vapor barrier material on to the core or the core subassembly is preferably accomplished by infrared radiation (IR). IR advantageously heats the moisture vapor material, e.g., butyl rubber, locally without penetrating the underlying golf ball core and/or other encased layers. Hence, the predetermined properties of the core and/or of the encased layers would not be affected by the heating/curing of the moisture vapor barrier layer. U.S. Pat. No. 6,174,388 B1 discloses that IR can be used effectively to heat and cure the surface of a polymeric object while leaving the other portions of the object unchanged. U.S. Pat. Nos. 5,677,362 and 5,672,393 disclose that IR heating can be used in conjunction with ultraviolet heating to cure polymers effectively. The disclosures of the patents are incorporated by reference in their entirety.

Another advantage of using IR as the curing technique is that suitable moisture vapor barrier polymers, which have cured or cross-linking temperatures that are higher than the softening temperature or the melting temperature of the materials encased therein, can be now employed as the moisture vapor barrier layer and/or other outer layers.

In accordance to another aspect of the present invention, another suitable IR-cured water vapor barrier material is polysulfide rubber including those disclosed in U.S. Pat. Nos. 4,263,078 and 4,165,425, among others. These references are incorporated herein by reference. In one example, the polysulfide rubber is cured with lower alkyl tin oxide, such as di-n-butyl tin oxide, and used in hot applied processes as disclosed in the '425 patent. This particular polysulfide rubber is thiol terminated and cured with the lower alkyl tin oxide at temperatures between about 100° C. and about 300° C. to become a solid thermoplastic elastomer that can be softened by heating and then cast or injection molded into a water vapor barrier layer. This polysulfide compound is preferably cured by IR.

Another suitable IR-curable polysulfide rubber is based on thiol terminated liquid polysulfide polymer cured with zinc oxide and a sulfur containing compound selected from 2-mercaptobenzothiazol, zinc lower alkyl dithiocarbamate, and alkyl thiuram polysulfides at temperatures from about 200° F. to about 390° F. Agents, which improve the flowing properties of the composition, such as copolymers of styrene and alkylenes, organic or inorganic reinforcing fibrous materials, phenolic resins, coumarone-indene resins, antioxidants, heat stabilizers, polyalkylene polymers, factice, terpene resins, terpene resins esters, benzothiazyl disulfide, or diphenyl guanidine, can also be added to the composition. Advantageously, this polysulfide rubber possesses a good ability to wet the substrate and forms good bonds with such substrate when cooled and, therefore, is a preferred sealant for the golf ball core. This polysulfide compound is also preferably cured by IR.

Moisture vapor barrier layer comprising polysulfide rubber is fully disclosed in commonly-assigned co-pending U.S. patent application Ser. No. 10/755,638, entitled "Golf Ball With Vapor Barrier Layer and Method for Making Same," filed on Jan. 12, 2004 and published as U.S. 2004/0185963. The disclosure of this patent application is incorporated herein by reference.

In accordance to with another aspect of the present invention, suitable IR-cured water vapor barrier polymers include single-pack castable polymers. A preferred single-pack polymer uses uretdiones or blocked isocyanates to form a single-pack urethane component. The single-pack blocked isocyanate system, which preferably comprises isocyanate combined with an amine or polyol, is advantageously stable at room temperature. The application of heat, such as infrared radiation, causes the isocyanate to become unblocked or to react to form a urethane. No mixing or dynamically controlling the ratios of the components is required.

Uretdione castable materials can be pre-formulated as a single-pack system without premature reaction. The mixed single-pack material can be directly injected or poured into a mold, avoiding metering and mixing of multiple components. Parts can be made utilizing viscous or solid materials that previously could not be used with traditional two-pack systems. Advantageously, uretdiones and blocked isocyanates when combined with suitable reactive components can be milled into rubber stock for use with other manufacturing techniques, discussed above.

A non-limiting example of a single-pack system in accordance to the present invention is as follows. Finely ground uretdione is dispersed in a liquid polyol or polyamine in combination with a tin catalyst and cyclic amidine catalyst to form a slurry mixture. The slurry mixture is poured into a suitable golf ball mold to make the required part, e.g., core, intermediate layer, or cover. The mold is then heated to reach the predetermined deblocking temperature of about 150° C. to about 180° C., and the reaction is allowed sufficient time to complete. The cured component then can be removed from the mold for further processing, if necessary.

In another example, 3,5-dimethylpyrazole (DMP) blocked IPDI is used in place of the uretdione in the above example. The mold is then heated to the deblocking temperature of about 140° C. to about 160° C., and the reaction is allowed sufficient time to complete. In another non-limiting example, the single-pack moisture vapor barrier layer utilizes blocked isocyanates that volatilize when de-blocking occurs, such as diethylmaleonate (DEM) or methyl ethyl ketoxime (MEKO) blocked hexamethylene diisocyanate cyclic trimer. Such an example could be sprayed or dipped onto the golf ball core, subassembly or the like and then followed with an IR cure.

Non-limiting chemical structures of the single-pack system are shown below. Formation of uretdiones can occur as follows:

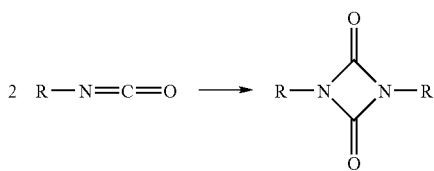

The preferred chemical structure of a polyuretdione crosslinker is as follows:

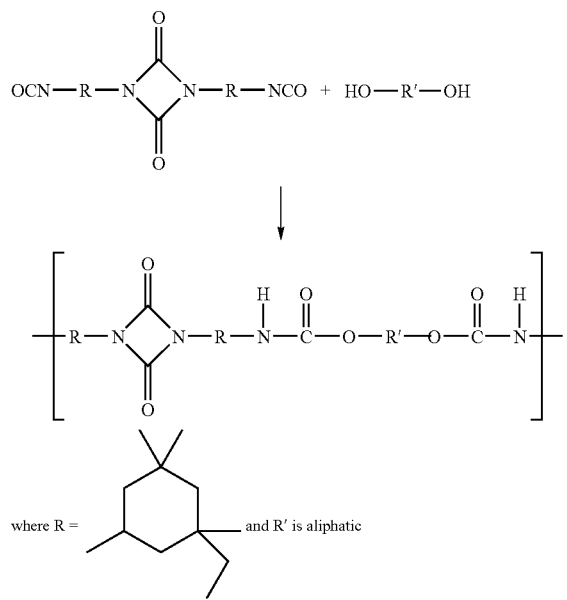

where R = [cyclohexyl structure] and R' is aliphatic

The preferred hardeners are uretdiones or blocked isocyanates, where the blocking agent remains in the component as a solid once cast, such as DMP or triazole blocked isocyanates. The structures of the preferred blocking agents are:

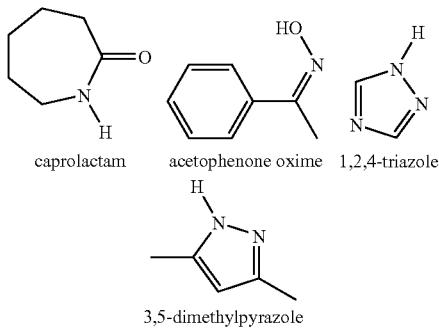

caprolactam   acetophenone oxime   1,2,4-triazole 3,5-dimethylpyrazole

Single-pack castable water vapor barrier material is fully disclosed in parent application Ser. No. 09/973,342, which has been incorporated by referenced.

Preferably, a golf ball in accordance to the present invention comprises a solid or multiple-layer solid polybutadiene core 12 having an outer diameter of greater than about 1.50 inches, more preferably 1.550 inches and most preferably about 1.580 inches. Moisture vapor barrier layer 14 has a thickness preferably in the range of about 0.001 inch to about 0.100 inch, more preferably in range of about 0.010 inch to about 0.050 inch, and cover 16 is a urethane cover with sufficient thickness to produce a 1.680 inch diameter golf ball.

More preferably, the moisture vapor barrier layer is a thin layer of suitable butyl rubber polymers discussed above, preferably less than 0.050 inch, more preferable less than 0.030 inch, and most preferably less than 0.010 inch. It is also preferable that the butyl rubber moisture vapor barrier layer would not significantly nor negatively affect the coefficient of restitution of the golf ball. Preferably, the polybutadiene core 12 and the thin butyl rubber moisture vapor barrier layer 14 are covered by a relatively soft polymer cover having a thickness from about 0.010 to about 0.050 inch, more preferably about 0.030 inch, which cover has a Shore D of less than 65 or from about 30 to about 60, more preferably from about 35 to about 50, and even more preferably about 40 to about 45. Such a cover is fully disclosed in U.S. Pat. Nos. 5,885,172 and 6,132,324. The disclosures of these two patents are incorporated herein by reference in their entireties. Preferred cover polymers include thermoset urethanes and polyurethanes, polyureas, thermoset urethane ionomers and thermoset urethane epoxies.

As discussed above and as shown in FIG. 3, golf ball 20 may have multiple layer core 12a, 12b and 12c, surrounded by intermediate layer 14 and dimpled cover 16. Core layers 12b and 12c are preferably integral solid layers or discrete layers molded on each other. Alternately, both inner and outer core layers, 12b and 12c, could be wound layers, or one of these two layers may be a wound layer, and innermost core, or center, 12a may be liquid-filled.

In some embodiments where the golf ball according to the invention comprises at least three core layers (i.e., at least center 12a, inner core layer 12b, and outer core layer 12c), one or more of the following characteristics can be present in the core layers:

a. the center may advantageously have (a) a diameter from about 0.5 inch to about 1.6 inches, (b) a Mooney viscosity greater than about 35, (c) a deflection under a load of about 100 kg of at least about 1 mm, (d) an amount of a diene crosslinker (e.g., zinc diacrylate) from about 10 to about 40 parts per hundred resin (phr), or (e) some combination thereof;
  b. the inner core layer may advantageously have (a) an outer diameter of not more than about 1.610 inches, (b) a Mooney viscosity greater than about 35, (c) an amount of a diene crosslinker (e.g., zinc diacrylate) from about 15 to about 45 parts per hundred resin (phr), or (d) some combination thereof; and
  c. the outer core layer may advantageously have (a) an outer diameter of not more than about 1.660 inches, (b) a Mooney viscosity greater than about 35, (c) an amount of a diene crosslinker (e.g., zinc diacrylate) from about 15 to about 45 parts per hundred resin (phr), or (d) some combination thereof.

In one embodiment, one or more (e.g., all) of the core layers can contain a sulfur compound such as zinc pentachlorothiophenol. In one embodiment, one or more (e.g. all) of the core layers can contain fillers such as barium sulfate, tungsten, zinc oxide, and combinations thereof.

In some embodiments where the core layers of the golf ball according to the invention exhibit a hardness gradient, the hardnesses of the center, inner core, and outer core layers may be respectively increasing (center hardness<inner core hardness<outer core hardness), such that, e.g., the center hardness can be no more than about 50 Shore C, the inner core hardness can be greater than about 50 Shore C, the outer core hardness can be greater than about 65 Shore C, or a combination thereof. These golf balls, in which the core hardness gradient increases from center to outer core, are typically harder and are usually better for increased hitting distance.

In other embodiments where the core layers of the golf ball according to the invention exhibit a hardness gradient, the hardnesses of the center, inner core, and outer core layers may be respectively decreasing (center hardness>inner core hardness>outer core hardness), such that, e.g., the center hardness can be greater than about 60 Shore C, the inner core hardness can be less than about 60 Shore C, the outer core hardness can be less than about 50 Shore C, or a combination thereof. These golf balls, in which the core hardness gradient decreases from center to outer core, are typically softer and generally have higher spin rates for better control.

In one embodiment, the specific gravities of each of the center, the inner core layer, and the outer core layer are substantially similar (e.g., within about 5% of each other). In another embodiment, the specific gravities of each of the center, the inner core layer, and the outer core layer are significantly different from each other (e.g., no one core layer being within about 5% of any other core layer). In another embodiment, the specific gravities of each of the center, the inner core layer, and the outer core layer can be such that two of the at least three core layers are substantially similar, while the third of the at least three core layers is significantly different from the two approximately equal layers.

In these multilayer core golf balls according to the invention, there can advantageously be at least one intermediate layer between the outermost core layer and the (innermost) cover layer that functions as a vapor barrier, e.g., against moisture and/or oxygen. Typically, in these embodiments, the moisture vapor transmission rate of the intermediate barrier layer(s) can advantageously be better (i.e., lower) than the moisture vapor transmission rate of Surlyn® (i.e., less than about 0.6 grams·mm/m$^2$·day, or less than the moisture vapor transmission rate of the cover material, if below about 0.6 grams·mm/m$^2$·day). In a preferred embodiment, the thickness of the intermediate barrier layer can be relatively uniform and not more than about 0.020 inch.

In one embodiment, the intermediate barrier layer comprises a thermoplastic elastomeric binder and a particulate material that has a low moisture and/or oxygen transmission rate. Without being bound to theory, it is believed that the particulate material can advantageously function by creating a tortuous path through which the transmittant/permeant (e.g., water vapor and/or oxygen) must travel. In one preferred embodiment, the ratio of particulate material to binder material can be from about 0.8:1.2 to about 1.2:0.8, preferably from about 0.9:1.1 to about 1.1:0.9, for example about 1:1. In another embodiment, the thermoplastic elastomeric binder can include a material such as Kraton®, while the particulate material can include a high aspect ratio (e.g., platelet-like, discotic, or the like) aluminum flake. Preferably, the aspect ratio is greater than 2:1.

In one preferred embodiment where there are at least three core layers and an intermediate barrier layer, the cover layer(s) can contain a thermoset or thermoplastic polyurethane (e.g., a polyurethaneurea) having a hardness from about 25 to about 65 Shore D and exhibiting a flexural modulus of at least about 2,000 psi.

In a preferred embodiment where a golf ball according to the invention contains at least three core layers, at least one intermediate barrier layer, and at least one cover layer, the resultant golf ball can advantageously exhibit one or more (e.g., all) of the following: an Atti compression of less than about 110; a COR of at least about 0.790; a deflection under a load of about 100 kg of at least about 1.5 mm; a cover surface having from about 250 to about 450 dimples; and a combination thereof.

The materials suitable for some of the layers of the golf balls according to the present invention can be found in commonly-assigned, co-pending U.S. patent application Ser. No. 11/061,338, filed Feb. 18, 2005, now published as U.S. patent application Publication No. 2005/0176523 A1, the disclosure of which is hereby incorporated by reference in its entirety.

In some embodiments, the core of the multi-layer golf ball may comprise a fluid (gas or liquid) filled core such as that described in U.S. patent application Ser. No. 10/670,514, and U.S. Pat. No. 6,632,147, the disclosures of both of which are incorporated herein by reference in their entireties. Suitable fluids usable in the cores in accordance with their specific gravities include air, other gases, aqueous solutions, liquids, gels, foams, hot-melts, other fluid materials and combinations thereof. Examples of suitable liquids include either solutions such as salt in water, corn syrup, salt in water and corn syrup, glycol and water or oils. The liquid can further include pastes, colloidal suspensions, such as clay, barytes, water or other liquid, or salt in water/glycol mixtures. Examples of suitable gels include water gelatin gels, hydrogels, water/methyl cellulose gels, and gels comprised of copolymer rubber based materials such a styrene-butadiene-styrene (SBS) rubber, and paraffinic and/or naphthenic oils. Examples of suitable melts include waxes and hot melts. Hot-melts are materials, which at or about normal room temperatures are solid but at elevated temperatures become liquid. A high melting temperature is desirable since the liquid core is heated to high temperatures during the molding of the inner core, outer core, and the cover. Alternatively, the liquid can be a selective reactive liquid system, which combines to form a solid. Examples of suitable reactive liquids are silicate gels, agar gels, peroxide cured polyester resins, two part epoxy resin systems, peroxide cured liquid polybutadiene rubber compositions, reactive polyurethanes, silicones, and polyesters. Additionally, suitable fluids also include low specific gravity liquid such as petroleum, vegetable or animal based oils, methanol, ethanol, ammonia, etc., or a high specific gravity liquid such as glycerin or carbon tetrachloride.

The core may also comprise thermosetting or thermoplastic materials such as polyurethane, polyurea, partially or fully neutralized ionomers, thermosetting polydiene rubber such as polybutadiene, polyisoprene, ethylene propylene diene monomer rubber, ethylene propylene rubber, natural rubber, balata, butyl rubber, halobutyl rubber, styrene butadiene rubber or any styrenic block copolymer such as styrene ethylene butadiene styrene rubber, etc., metallocene or other single site catalyzed polyolefin, polyurethane copolymers, e.g., with silicone, as long as the material meets the COR criteria described above.

In addition to the materials discussed above, compositions within the scope of the present invention can incorporate one or more polymers. Examples of suitable additional polymers for use in the present invention include, but are not limited to, the following: thermoplastic elastomer, thermoset elastomer, synthetic rubber, thermoplastic vulcanizate, copolymeric ionomer, terpolymeric ionomer, polycarbonate, polyolefin, polyamide, copolymeric polyamide, polyesters, polyvinyl alcohols, acrylonitrile-butadiene-styrene copolymers, polyarylate, polyacrylate, polyphenylene ether, impact-modified polyphenylene ether, high impact polystyrene, diallyl phthalate polymer, metallocene catalyzed polymers, styrene-acrylonitrile (SAN) (including olefin-modified SAN and acrylonitrile-styrene-acrylonitrile), styrene-maleic anhydride (S/MA) polymer, styrenic copolymer, functionalized styrenic copolymer, functionalized styrenic terpolymer, styrenic terpolymer, cellulose polymer, liquid crystal polymer (LCP), ethylene-propylene-diene terpolymer (EPDM), ethylene-vinyl acetate copolymers (EVA), ethylene-propylene copolymer, ethylene vinyl acetate, polyurea, and polysiloxane, or any metallocene-catalyzed polymers of these species. Suitable polyamides for use as an additional material in compositions within the scope of the present invention also include resins obtained by: (1) polycondensation of (a) a dicarboxylic acid, such as oxalic acid, adipic acid, sebacic acid, terephthalic acid, isophthalic acid or 1,4-cyclohexanedicarboxylic acid, with (b) a diamine, such as ethylenediamine, tetramethylenediamine, pentamethylenediamine, hexamethylenediamine or decamethylenediamine, 1,4-cycohexyldiamine, or m-xylylenediamine; (2) a ring-opening polymerization of cyclic lactam, such as ε-caprolactam or ω-laurolactam; (3) polycondensation of an aminocarboxylic acid, such as 6-aminocaproic acid, 9-aminononanoic acid, 11-aminoundecanoic acid, or 12-aminododecanoic acid; or (4) copolymerization of a cyclic lactam with a dicarboxylic acid and a diamine. Specific examples of suitable polyamides include Nylon 6, Nylon 66, Nylon 610, Nylon 11, Nylon 12, Nylon MXD6, Nylon 46, and copolymerized Nylons.

Other preferred materials suitable for use as an additional material in compositions within the scope of the present invention include polyester elastomers marketed under the tradename SKYPEL™ by SK Chemicals of South Korea, or diblock or triblock copolymers marketed under the tradename SEPTON™ by Kuraray Corporation of Kurashiki, Japan, and KRATON™ by Kraton Polymers Group of Companies of Chester, United Kingdom. All of the materials listed above can provide for particular enhancements to ball layers prepared within the scope of the present invention.

Ionomers also are well suited for blending into compositions within the scope of the present invention. Suitable ionomeric polymers (e.g., copolymer- or terpolymer-type ionomers) include α-olefin/unsaturated carboxylic acid copolymer-type ionomeric or terpolymer-type ionomeric resins. Copolymeric ionomers are obtained by neutralizing at least a portion of the carboxylic groups in a copolymer of an α-olefin and an α,β-unsaturated carboxylic acid having about 3 to about 8 carbon atoms, with a metal ion. Examples of suitable α-olefins include, but are not limited to, ethylene, propylene, 1-butene, and 1-hexene. Examples of suitable unsaturated carboxylic acids include, but are not limited to, acrylic, methacrylic, ethacrylic, α-chloroacrylic, crotonic, maleic, fumaric, and itaconic acids. Copolymeric ionomers include ionomers having varied acid contents and degrees of acid neutralization neutralized by monovalent or bivalent cations discussed above.

Terpolymeric ionomers are obtained by neutralizing at least a portion of carboxylic groups in a terpolymer of an α-olefin, an α,β-unsaturated carboxylic acid having about 3 to about 8 carbon atoms, and an α,β-unsaturated carboxylate having about 2 to about 22 carbon atoms with metal ion. Examples of suitable ionomeric resins include, but are not limited to, those marketed under the tradenames SURLYN®, manufactured by E.I. du Pont de Nemours & Company of Wilmington, Del., and IOTEK®, manufactured by Exxon Mobil Corporation of Irving, Tex.

Silicone materials also are well suited for blending into compositions within the scope of the present invention. These can be monomers, oligomers, prepolymers, or polymers, with or without additional reinforcing filler. One type of silicone material that is suitable can incorporate at least 1 alkenyl group having at least 2 carbon atoms in their molecules. Examples of these alkenyl groups include, but are not limited to, vinyl, allyl, butenyl, pentenyl, hexenyl, and decenyl. The alkenyl functionality can be located at any location of the silicone structure, including one or both terminals of the structure. The remaining (i.e., non-alkenyl) silicon-bonded organic groups in this component are independently selected from hydrocarbon or halogenated hydrocarbon groups that contain no aliphatic unsaturation. Non-limiting examples of these include: alkyl groups, such as methyl, ethyl, propyl, butyl, pentyl, and hexyl; cycloalkyl groups, such as cyclohexyl and cycloheptyl; aryl groups, such as phenyl, tolyl, and xylyl; aralkyl groups, such as benzyl and phenethyl; and halogenated alkyl groups, such as 3,3,3-trifluoropropyl and chloromethyl. Another type of silicone material suitable for use in the present invention is one having hydrocarbon groups that lack aliphatic unsaturation. Specific examples of suitable silicones for use in making compositions of the present invention include, but are not limited to, the following: trimethylsiloxy-endblocked dimethylsiloxane-methylhexenylsiloxane copolymers; dimethylhexenlylsiloxy-endblocked dimethylsiloxane-methylhexenylsiloxane copolymers; trimethylsiloxy-endblocked dimethylsiloxane-methylvinylsiloxane copolymers; trimethylsiloxy-endblocked methylphenylsiloxane-dimethylsiloxane-methylvinylsiloxane copolymers; dimethylvinylsiloxy-endblocked dimethylpolysiloxanes; dimethylvinylsiloxy-endblocked dimethylsiloxane-methylvinylsiloxane copolymers; dimethylvinylsiloxy-endblocked methylphenylpolysiloxanes; dimethylvinylsiloxy-endblocked methylphenylsiloxane-dimethylsiloxane-methylvinylsiloxane copolymers; and copolymers of those listed above, in which at least one end group is a dimethylhydroxysiloxy group. Commercially available silicones suitable for use in compositions within the scope of the present invention include Silastic™ by Dow Corning Corp. of Midland, Mich., Blensil™ by GE Silicones of Waterford, N.Y., and Elastosil™ by Wacker Silicones of Adrian, Mich.

Other types of copolymers also can be added to compositions within the scope of the present invention. Examples of copolymers comprising epoxy monomers and which are suitable for use within the scope of the present invention include, but are not limited to, SBS block copolymers, in which the polybutadiene block contains an epoxy group, and styrene-isoprene-styrene (SIS) block copolymers, in which the polyisoprene block contains an epoxy group. Commercially available examples of these epoxy functional copolymers include ESBS™ A1005, ESBS™ A1010, ESBS™ A1020, ESBS™ AT018, and ESBS™ AT019, marketed by Daicel Chemical Industries, Ltd. of Osaka, Japan.

A preferred embodiment for a slow core comprises polybutadiene, SBR, little or no zinc diacrylate (from 0-10 parts), optional zinc dimethacrylate, or a non zinc salt unsatured monomer such as trimethylol propane triacrylate (SR-350™, sold by the Sartomer Co.), a peroxide initiator. Other formulations for the core are disclosed in co-pending commonly owned U.S. patent application Ser. No. 10/845,721, which is incorporated herein by reference in its entirety. Alternatively, a non-peroxide, sulfur vulcanized formulation, such as that disclosed in pending U.S. patent application Ser. No. 10/772, 689 can be used. This reference is also incorporated by reference herein in its entirety.

The core diameter ranges from about 0.100 inch to about 1.64 inch, preferably from about 1.00 inch to about 1.62 inch. Typical core diameter can range from about 0.25 inch to about 1.625 inches, in increments of about 0.05 inch. Common core sizes include, but are not limited to, 0.050 inch, 1.00 inch, 1.10 inches, 1.20 inches, 1.30 inches, 1.40 inches, 1.45 inches, 1.50 inches, 1.55 inches, 1.57 inches, 1.58 inches, 1.59 inches, and 1.60 inches. That is, the sizes of the core plus any intermediate layer or layers may be within the same size or size range as the core sizes above.

Other suitable materials for the core include, but are not limited to:
   a. Polyurethanes, such as those prepared from polyols and diisocyanates or polyisocyanates and those disclosed in U.S. Pat. Nos. 5,334,673 and 6,506,851 and in U.S. patent application Ser. No. 10/194,059;
   b. Polyureas, such as those disclosed in U.S. Pat. No. 5,484,870 and in U.S. patent application Ser. No. 10/228,311; and
   c. Polyurethaneurea hybrids, blends or copolymers comprising urethane and/or urea segments.

The core of the multi-layer golf ball preferably includes a polyurethane composition comprising the reaction product of at least one polyisocyanate and at least one curing agent. The curing agent can include, for example, one or more diamines, one or more polyols, or a combination thereof. The polyisocyanate can be combined with one or more polyols to form a prepolymer, which is then combined with the at least one curing agent. Thus, the polyols described herein are suitable for use in one or both components of the polyurethane material, i.e., as part of a prepolymer and in the curing agent.

The core or any layer in the golf ball can also be made from highly-neutralized polymers and blends thereof ("HNP"). The acid moieties of the HNP's, typically ethylene-based ionomers, are preferably neutralized greater than about 70%, more preferably greater than about 90%, and most preferably at least about 100%. The HNP's can be also be blended with a second polymer component, which, if containing an acid group, may be neutralized in a conventional manner, by the organic fatty acids of the present invention, or both. The second polymer component, which may be partially or fully neutralized, preferably comprises ionomeric copolymers and terpolymers, ionomer precursors, thermoplastics, polyamides, polycarbonates, polyesters, polyurethanes, polyureas, thermoplastic elastomers, polybutadiene rubber, balata, metallocene-catalyzed polymers (grafted and non-grafted), single-site polymers, high-crystalline acid polymers, cationic ionomers, and the like. HNP polymers typically have a material hardness of between about 20 and about 80 Shore D, and a flexural modulus of between about 3,000 psi and about 200,000 psi.

The base rubber of one or more of the core layers can include natural or synthetic rubbers. A preferred base rubber is 1,4-polybutadiene having a cis-structure of at least 40%. More preferably, the base rubber comprises high-Mooney-viscosity rubber. If desired, the polybutadiene can also be mixed with other elastomers known in the art such as natural rubber, polyisoprene rubber and/or styrene-butadiene rubber in order to modify the properties of the core.

The crosslinking agent includes a metal salt of an unsaturated fatty acid such as a zinc salt or a magnesium salt of an unsaturated fatty acid having 3 to 8 carbon atoms such as acrylic or methacrylic acid. Suitable cross linking agents include metal salt diacrylates, dimethacrylates and monomethacrylates wherein the metal is magnesium, calcium, zinc, aluminum, sodium, lithium or nickel. The crosslinking agent is present in an amount from about 15 to about 30 parts per hundred of the rubber, preferably in an amount from about 19 to about 25 parts per hundred of the rubber and most preferably having about 20 to 24 parts crosslinking agent per hundred of rubber. The core compositions of the present invention may also include at least one organic or inorganic cis-trans catalyst to convert a portion of the cis-isomer of polybutadiene to the trans-isomer, as desired.

The initiator agent can be any known polymerization initiator which decomposes during the cure cycle. Suitable initiators include peroxide compounds such as dicumyl peroxide, 1,1-di-(t-butylperoxy) 3,3,5-trimethyl cyclohexane, a-a bis-(t-butylperoxy) diisopropylbenzene, 2,5-dimethyl-2,5 di-(t-butylperoxy) hexane or di-t-butyl peroxide and mixtures thereof.

Fillers, any compound or composition that can be used to vary the density and other properties of the core, typically include materials such as tungsten, zinc oxide, barium sulfate, silica, calcium carbonate, zinc carbonate, metals, metal oxides and salts, regrind (recycled core material typically ground to about 30 mesh particle), high-Mooney-viscosity rubber regrind, and the like.

At least one of the outer core layers can be formed of a resilient rubber-based component comprising a high-Mooney-viscosity rubber, and a crosslinking agent present in an amount from about 20 to about 40 parts per hundred, from about 30 to about 38 parts per hundred, and most preferably about 37 parts per hundred. It should be understood that the term "parts per hundred" is with reference to the rubber by weight.

When the core is formed with a fluid-filled center, the center is formed first then the inner core is molded around the center. Conventional molding techniques can be used for this operation. Then the outer core and cover are formed thereon, as discussed above. The fluid within the inner core can be a wide variety of materials including air, water solutions, liquids, gels, foams, hot-melts, other fluid materials and combinations thereof. The fluid is varied to modify the performance parameters of the ball, such as the moment of inertia or the spin decay rate. Examples of suitable liquids include either solutions such as salt in water, corn syrup, salt in water and corn syrup, glycol and water or oils. The liquid can further include pastes, colloidal suspensions, such as clay, barytes, carbon black in water or other liquid, or salt in water/glycol mixtures. Examples of suitable gels include water gelatin gels, hydrogels, water/methyl cellulose gels and gels comprised of copolymer rubber based materials such a styrene-butadiene-styrene rubber and paraffinic and/or naphthenic oil. Examples of suitable melts include waxes and hot melts. Hot-melts are materials which at or about normal room temperatures are solid but at elevated temperatures become liquid. A high melting temperature is desirable since the liquid core is heated to high temperatures during the molding of the inner core, outer core, and the cover. The liquid can be a reactive liquid system, which combines to form a solid. Examples of suitable reactive liquids are silicate gels, agar gels, peroxide cured polyester resins, two part epoxy resin systems, and peroxide cured liquid polybutadiene rubber compositions.

The "effective compression constant," which is designated EC, is the ratio of deflection of a 1.50 inch diameter sphere made of any single material used in the core under a ~100 kg load that as represented by the formula EC=F/d, where, F is a ~100 kg load; and d is the deflection in millimeters. If the sphere tested is only inner core material, the effective compression constant for the inner core material alone is designated $EC_{IC}$. If the sphere tested is only outer core material, the effective compression constant for the outer core material alone is designated $EC_{OC}$. The sum of the constants for the inner core $EC_{IC}$ and outer core $EC_{OC}$ is the constant $EC_S$. If the sphere tested is inner and outer core material, the core effective compression constant is designated $EC_C$. It is has been determined that very favorable cores are formed when their core effective compression constant $EC_C$ is less than the sum of the effective compression constants of the inner core and outer core $EC_S$. It is recommended that the core effective compression constant $EC_C$ is less than about 90% of the sum of the effective compression constants of the inner core and outer core $EC_S$. More preferably, the core effective compression constant $EC_C$ is less than or equal to about 50% of the sum of the effective compression constants of the inner core and outer core $EC_S$. The ratios of the inner core material to outer core material and the geometry of the inner core to the outer core are selected to achieve these core effective compression constants.

The resultant golf balls typically have a coefficient of restitution of greater than about 0.7, preferably greater than about 0.75, and more preferably greater than about 0.78. The golf balls also typically have an Atti compression of at least about 40, preferably from about 50 to 120, and more preferably from about 60 to 100. The golf ball cured polybutadiene material typically has a hardness of at least about 15 Shore A, preferably between about 30 Shore A and 80 Shore D, more preferably between about 50 Shore A and 60 Shore D.

In addition to the HNP's neutralized with organic fatty acids and salts thereof, core compositions may comprise at least one rubber material having a resilience index of at least about 40. Preferably, the resilience index is at least about 50. Polymers that produce resilient golf balls and, therefore, are suitable for the present invention can include, but are not limited to, CB23 and CB22, commercially available from of Bayer Corp. of Orange, Tex., BR60, commercially available from Enichem of Italy, and 1207G, commercially available from Goodyear Corp. of Akron, Ohio.

Additionally, the unvulcanized rubber, such as polybutadiene, in golf balls prepared according to the invention typically has a Mooney viscosity of between about 40 and about 80, more preferably, between about 45 and about 65, and most preferably, between about 45 and about 55. Mooney viscosity is typically measured according to ASTM-D1646.

In yet another embodiment, the core can comprise a reaction product that includes a cis-to-trans catalyst, a resilient polymer component having polybutadiene, a free radical source, and optionally, a crosslinking agent, a filler, or both. Preferably, the polybutadiene reaction product is used to form at least a portion of the core of the golf ball, and further discussion below relates to this embodiment for preparing the core. Preferably, the reaction product has a first dynamic stiffness measured at −50° C. that is less than about 130 percent of a second dynamic stiffness measured at 0° C. More preferably, the first dynamic stiffness is less than about 125 percent of the second dynamic stiffness. Most preferably, the first dynamic stiffness is less than about 110 percent of the second dynamic stiffness.

The cis-to-trans conversion requires the presence of a cis-to-trans catalyst, such as an organosulfur or metal-containing organosulfur compound, a substituted or unsubstituted aromatic organic compound that does not contain sulfur or metal, an inorganic sulfide compound, an aromatic organometallic compound, or mixtures thereof. The cis-to-trans catalyst component may include one or more of the cis-to-trans catalysts described herein. For example, the cis-to-trans catalyst may be a blend of an organosulfur component and an inorganic sulfide component.

The preferred organosulfur components include 4,4'-diphenyl disulfide, 4,4'-ditolyl disulfide, or 2,2'-benzamido diphenyl disulfide, or a mixture thereof. An additional preferred organosulfur components include, but are not limited to, pentachlorothiophenol, zinc pentachlorothiophenol, non-metal salts of pentachlorothiophenol such as ammonium salt of pentachlorothiophenol magnesium pentachlorothiophenol, cobalt pentachlorothiophenol, pentafluorothiophenol, zinc pentafluorothiophenol, and blends thereof. Preferred candidates are pentachlorothiophenol (available from Strucktol Company of Stow, Ohio), zinc pentachlorothiophenol (available from eChinachem of San Francisco, Calif.), and blends thereof. Additional examples are described in commonly-owned copending U.S. patent application Ser. No. 10/882,130, which is incorporated herein by reference in its entirety.

The organosulfur cis-to-trans catalyst, when present, is preferably present in an amount sufficient to produce the reaction product so as to contain at least about 12 percent trans-polybutadiene isomer, but typically is greater than about 32 percent trans-polybutadiene isomer based on the total resilient polymer component. In another embodiment, metal-containing organosulfur components can be used according to the invention. Suitable metal-containing organosulfur components include, but are not limited to, cadmium, copper, lead, and tellurium analogs of diethyldithiocarbamate, diamyldithiocarbamate, and dimethyldithiocarbamate, or mixtures thereof. Additional suitable examples of can be found in commonly owned and co-pending U.S. patent application Ser. No. 10/402,592.

The compositions of the present invention may also include fillers, added to the polybutadiene material to adjust the density and/or specific gravity of the core or to the cover. Fillers are typically polymeric or mineral particles. Exemplary fillers include precipitated hydrated silica, clay, talc, asbestos, glass fibers, aramid fibers, mica, calcium metasilicate, barium sulfate, zinc sulfide, lithopone, silicates, silicon carbide, diatomaceous earth, polyvinyl chloride, carbonates such as calcium carbonate and magnesium carbonate, metals such as titanium, tungsten, aluminum, bismuth, nickel, molybdenum, iron, lead, copper, boron, cobalt, beryllium, zinc, and tin, metal alloys such as steel, brass, bronze, boron carbide whiskers, and tungsten carbide whiskers, metal oxides such as zinc oxide, iron oxide, aluminum oxide, titanium oxide, magnesium oxide, and zirconium oxide, particulate carbonaceous materials such as graphite, carbon black, cotton flock, natural bitumen, cellulose flock, and leather fiber, micro balloons such as glass and ceramic, fly ash, and combinations thereof.

Antioxidants may also optionally be included in the polybutadiene material in the centers produced according to the present invention. Antioxidants are compounds that can inhibit or prevent the oxidative degradation of the polybutadiene. Antioxidants useful in the present invention include, but are not limited to, dihydroquinoline antioxidants, amine type antioxidants, and phenolic type antioxidants.

Other optional ingredients, such as accelerators, e.g., tetramethylthiuram, peptizers, processing aids, processing oils, plasticizers, dyes and pigments, as well as other additives well known to those of ordinary skill in the art may also be used in the present invention in amounts sufficient to achieve the purpose for which they are typically used.

The PGA compression of the core, or portion of the core, of golf balls prepared according to the invention is typically from about 160 or less as measured on a sphere, preferably about 10 to about 150, more preferably about 15 to about 140 and most preferably about 20 to about 120. Various equivalent methods of measuring compression exist. For example, a 70 Atti compression (also previously referred to as the "PGA Compression") is equivalent to a center hardness of 3.2 mm deflection under a 100 kg load and a "spring constant" of 36 kgf/mm. In one embodiment, the golf ball core has a deflection of about 3.3 mm to 7 mm under a 130 kg-10 kg test. The various methods for measuring compression are discussed in the J. Dalton paper, discussed above.

Any of the suitable core materials discussed above can be used in any other layers on the ball.

This golf ball can likewise include one or more homopolymeric or copolymeric inner cover materials, such as:

a. Vinyl resins, such as those formed by the polymerization of vinyl chloride, or by the copolymerization of vinyl chloride with vinyl acetate, acrylic esters or vinylidene chloride;

b. Polyolefins, such as polyethylene, polypropylene, polybutylene and copolymers such as ethylene methylacrylate, ethylene ethylacrylate, ethylene vinyl acetate, ethylene methacrylic or ethylene acrylic acid or propylene acrylic acid and copolymers and homopolymers produced using a single-site catalyst or a metallocene catalyst;

c. Polyurethanes, such as those prepared from polyols and diisocyanates or polyisocyanates, in particular PPDI-based thermoplastic polyurethanes, and those disclosed in U.S. Pat. No. 5,334,673;

d. Polyureas, such as those disclosed in U.S. Pat. No. 5,484,870;

e. Polyamides, such as poly(hexamethylene adipamide) and others prepared from diamines and dibasic acids, as well as those from amino acids such as poly(caprolactam), and blends of polyamides with SURLYN®, polyethylene, ethylene copolymers, ethylene-propylene-non-conjugated diene terpolymer, and the like;

f. Acrylic resins and blends of these resins with poly vinyl chloride, elastomers, and the like;

g. Thermoplastics, such as urethane; olefinic thermoplastic rubbers, such as blends of polyolefins with ethylene-propylene-non-conjugated diene terpolymer; block copolymers of styrene and butadiene, isoprene or ethylene-butylene rubber; or copoly(ether-amide), such as PEBAX®, sold by ELF Atochem of Philadelphia, Pa.;

h. Polyphenylene oxide resins or blends of polyphenylene oxide with high impact polystyrene as sold under the trademark NORYL® by General Electric Company of Pittsfield, Mass.;

i. Thermoplastic polyesters, such as polyethylene terephthalate, polybutylene terephthalate, polyethylene terephthalate/glycol modified, poly(trimethylene terepthalate), and elastomers sold under the trademarks HYTREL® by E.I. DuPont de Nemours & Co. of Wilmington, Del., and LOMOD® by General Electric Company of Pittsfield, Mass.;

j. Blends and alloys, including polycarbonate with acrylonitrile butadiene styrene, polybutylene terephthalate, polyethylene terephthalate, styrene maleic anhydride, polyethylene, elastomers, and the like, and polyvinyl chloride with acrylonitrile butadiene styrene or ethylene vinyl acetate or other elastomers; and k. Blends of thermoplastic rubbers with polyethylene, propylene, polyacetal, nylon, polyesters, cellulose esters, and the like.

Preferably, the inner cover includes polymers, such as ethylene, propylene, butene-1 or hexane-1 based homopolymers or copolymers including functional monomers, such as acrylic and methacrylic acid and fully or partially neutralized ionomer resins and their blends, methyl acrylate, methyl methacrylate homopolymers and copolymers, imidized, amino group containing polymers, polycarbonate, reinforced polyamides, polyphenylene oxide, high impact polystyrene, polyether ketone, polysulfone, poly(phenylene sulfide), acrylonitrile-butadiene, acrylic-styrene-acrylonitrile, poly(ethylene terephthalate), poly(butylene terephthalate), poly(vinyl alcohol), poly(tetrafluoroethylene) and their copolymers including functional comonomers, and blends thereof. Suitable cover compositions also include a polyether or polyester thermoplastic urethane, a thermoset polyurethane, a low modulus ionomer, such as acid-containing ethylene copolymer ionomers, including E/X/Y terpolymers where E is ethylene, X is an acrylate or methacrylate-based softening comonomer present in about 0 to 50 weight percent and Y is acrylic or methacrylic acid present in about 5 to 35 weight percent. More preferably, in a low spin rate embodiment designed for maximum distance, the acrylic or methacrylic acid is present in about 16 to 35 weight percent, making the ionomer a high modulus ionomer. In a higher spin embodiment, the inner cover layer includes an ionomer where an acid is present in about 10 to 15 weight percent and includes a softening comonomer. Additionally, high-density polyethylene ("HDPE"), low-density polyethylene ("LDPE"), LLDPE, and homo- and co-polymers of polyolefin are suitable for a variety of golf ball layers.

In one embodiment, the outer cover preferably includes a polyurethane composition comprising the reaction product of at least one polyisocyanate, polyol, and at least one curing agent. Any polyisocyanate available to one of ordinary skill in the art is suitable for use according to the invention. Exemplary polyisocyanates include, but are not limited to, 4,4'-diphenylmethane diisocyanate ("MDI"); polymeric MDI; carbodiimide-modified liquid MDI; 4,4'-dicyclohexylmethane diisocyanate ("$H_{12}$MDI"); p-phenylene diisocyanate ("PPDI"); m-phenylene diisocyanate ("MPDI"); toluene diisocyanate ("TDI"); 3,3'-dimethyl-4,4'-biphenylene diisocyanate ("TODI"); isophoronediisocyanate ("IPDI"); hexamethylene diisocyanate ("HDI"); naphthalene diisocyanate ("NDI"); xylene diisocyanate ("XDI"); p-tetramethylxylene diisocyanate ("p-TMXDI"); m-tetramethylxylene diisocyanate ("m-TMXDI"); ethylene diisocyanate; propylene-1,2-diisocyanate; tetramethylene-1,4-diisocyanate; cyclohexyl diisocyanate; 1,6-hexamethylene-diisocyanate ("HDI"); dodecane-1,12-diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; methyl cyclohexylene diisocyanate; triisocyanate of HDI; triisocyanate of 2,4,4-trimethyl-1,6-hexane diisocyanate ("TMDI"); tetracene diisocyanate; napthalene diisocyanate; anthracene diisocyanate; isocyanurate of toluene diisocyanate; uretdione of hexamethylene diisocyanate; and mixtures thereof. Polyisocyanates are known to those of ordinary skill in the art as having more than one isocyanate group, e.g., diisocyanate, tri-isocyanate, and tetra-isocyanate. Preferably, the polyisocyanate includes MDI, PPDI, TDI, or a mixture thereof, and more preferably, the polyisocyanate includes MDI. It should be understood that, as used herein, the term "MDI" includes 4,4'-diphenylmethane diisocyanate, polymeric MDI, carbodiimide-modified liquid MDI, and mixtures thereof and, additionally, that the diisocyanate employed may be "low free monomer," understood by one of ordinary skill in the art to have lower levels of "free" monomer isocyanate groups, typically less than about 0.1% free monomer groups. Examples of "low free monomer" diisocyanates include, but are not limited to Low Free Monomer MDI, Low Free Monomer TDI, and Low Free Monomer PPDI.

The at least one polyisocyanate should have less than about 14% unreacted NCO groups. Preferably, the at least one polyisocyanate has no greater than about 7.5% NCO, and more preferably, less than about 7.0%.

Any polyol available to one of ordinary skill in the art is suitable for use according to the invention. Exemplary polyols include, but are not limited to, polyether polyols, hydroxy-terminated polybutadiene (including partially/fully hydrogenated derivatives), polyester polyols, polycaprolactone polyols, and polycarbonate polyols. In one preferred embodiment, the polyol includes polyether polyol. Examples include, but are not limited to, polytetramethylene ether glycol ("PTMEG"), polyethylene propylene glycol, polyoxypropylene glycol, and mixtures thereof. The hydrocarbon chain can have saturated or unsaturated bonds and substituted or unsubstituted aromatic and cyclic groups. Preferably, the polyol of the present invention includes PTMEG.

In another embodiment, polyester polyols are included in the polyurethane material of the invention. Suitable polyester polyols include, but are not limited to, polyethylene adipate glycol; polybutylene adipate glycol; polyethylene propylene adipate glycol; o-phthalate-1,6-hexanediol; poly(hexamethylene adipate) glycol; and mixtures thereof. The hydrocarbon chain can have saturated or unsaturated bonds, or substituted or unsubstituted aromatic and cyclic groups.

In another embodiment, polycaprolactone polyols are included in the materials of the invention. Suitable polycaprolactone polyols include, but are not limited to, 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, and mixtures thereof. The hydrocarbon chain can have saturated or unsaturated bonds, or substituted or unsubstituted aromatic and cyclic groups.

In yet another embodiment, the polycarbonate polyols are included in the polyurethane material of the invention. Suitable polycarbonates include, but are not limited to, polyphthalate carbonate and poly(hexamethylene carbonate) glycol. The hydrocarbon chain can have saturated or unsaturated bonds, or substituted or unsubstituted aromatic and cyclic groups. In one embodiment, the molecular weight of the polyol is from about 200 to about 4000.

Polyamine curatives are also suitable for use in the polyurethane composition of the invention and have been found to improve cut, shear, and impact resistance of the resultant balls. Preferred polyamine curatives include, but are not limited to, 3,5-dimethylthio-2,4-toluenediamine and isomers thereof; 3,5-diethyltoluene-2,4-diamine and isomers thereof, such as 3,5-diethyltoluene-2,6-diamine; 4,4'-bis-(sec-butylamino)-diphenylmethane; 1,4-bis-(sec-butylamino)-benzene, 4,4'-methylene-bis-(2-chloroaniline); 4,4'-methylene-bis-(3-chloro-2,6-diethylaniline) ("MCDEA"); polytetramethyleneoxide-di-p-aminobenzoate; N,N'-dialkyl-diamino diphenyl methane; p,p'-methylene dianiline ("MDA"); m-phenylenediamine ("MPDA"); 4,4'-methylene-bis-(2-chloroaniline) ("MOCA"); 4,4'-methylene-bis-(2,6-diethylaniline) ("MDEA"); 4,4'-methylene-bis-(2,3-dichloroaniline) ("MDCA"); 4,4'-diamino-3,3'-diethyl-5,5'-dimethyl diphenylmethane; 2,2', 3,3'-tetrachloro diamino diphenylmethane; trimethylene glycol di-p-aminobenzoate; and mixtures thereof. Preferably, the curing agent of the present invention includes 3,5-dimethylthio-2,4-toluenediamine and isomers thereof, such as ETHACURE 300, commercially available from Albermarle Corporation of Baton Rouge, La. Suitable polyamine curatives, which include both primary and secondary amines, preferably have molecular weights ranging from about 64 to about 2000.

At least one of a diol, triol, tetraol, or hydroxy-terminated curatives may be added to the aforementioned polyurethane composition. Suitable diol, triol, and tetraol groups include ethylene glycol; diethylene glycol; polyethylene glycol; propylene glycol; polypropylene glycol; lower molecular weight polytetramethylene ether glycol; 1,3-bis(2-hydroxyethoxy) benzene; 1,3-bis-[2-(2-hydroxyethoxy) ethoxy]benzene; 1,3-bis-{2-[2-(2-hydroxyethoxy) ethoxy]ethoxy}benzene; 1,4-butanediol; 1,5-pentanediol; 1,6-hexanediol; resorcinol-di-(β-hydroxyethyl) ether; hydroquinone-di-(β-hydroxyethyl) ether; and mixtures thereof. Preferred hydroxy-terminated curatives include 1,3-bis(2-hydroxyethoxy) benzene; 1,3-bis-[2-(2-hydroxyethoxy) ethoxy]benzene; 1,3-bis-{2-[2-(2-hydroxyethoxy) ethoxy]ethoxy}benzene; 1,4-butanediol, and mixtures thereof. Preferably, the hydroxy-terminated curatives have molecular weights ranging from about 48 to 2000. It should be understood that molecular weight, as used herein, is the absolute weight average molecular weight and would be understood as such by one of ordinary skill in the art.

Both the hydroxy-terminated and amine curatives can include one or more saturated, unsaturated, aromatic, and cyclic groups. Additionally, the hydroxy-terminated and amine curatives can include one or more halogen groups. The polyurethane composition can be formed with a blend or mixture of curing agents. If desired, however, the polyurethane composition may be formed with a single curing agent.

In a preferred embodiment of the present invention, saturated polyurethanes used to form cover layers, preferably the outer cover layer, and may be selected from among both castable thermoset and thermoplastic polyurethanes.

In this embodiment, the saturated polyurethanes of the present invention are substantially free of aromatic groups or moieties. Saturated polyurethanes suitable for use in the invention are a product of a reaction between at least one polyurethane prepolymer and at least one saturated curing agent. The polyurethane prepolymer is a product formed by a reaction between at least one saturated polyol and at least one saturated diisocyanate. As is well known in the art, a catalyst may be employed to promote the reaction between the curing agent and the isocyanate and polyol.

Saturated diisocyanates which can be used include, without limitation, ethylene diisocyanate; propylene-1,2-diisocyanate; tetramethylene-1,4-diisocyanate; 1,6-hexamethylene-diisocyanate ("HDI"); 2,2,4-trimethylhexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; isophorone diisocyanate ("IPDI"); methyl cyclohexylene diisocyanate; triisocyanate of HDI; triisocyanate of 2,2,4-trimethyl-1,6-hexane diisocyanate ("TMDI"). The most preferred saturated diisocyanates are 4,4'-dicyclohexylmethane diisocyanate ("HMDI") and isophorone diisocyanate ("IPDI").

Saturated polyols which are appropriate for use in this invention include without limitation polyether polyols such as polytetramethylene ether glycol and poly(oxypropylene) glycol. Suitable saturated polyester polyols include polyethylene adipate glycol, polyethylene propylene adipate glycol, polybutylene adipate glycol, polycarbonate polyol and ethylene oxide-capped polyoxypropylene diols. Saturated polycaprolactone polyols which are useful in the invention include diethylene glycol-initiated polycaprolactone, 1,4-butanediol-initiated polycaprolactone, 1,6-hexanediol-initiated polycaprolactone; trimethylol propane-initiated polycaprolactone, neopentyl glycol initiated polycaprolactone, and polytetramethylene ether glycol-initiated polycaprolactone. The most preferred saturated polyols are polytetramethylene ether glycol and PTMEG-initiated polycaprolactone.

Suitable saturated curatives include 1,4-butanediol, ethylene glycol, diethylene glycol, polytetramethylene ether glycol, propylene glycol; trimethanolpropane; tetra-(2-hydroxypropyl)-ethylenediamine; isomers and mixtures of isomers of cyclohexyldimethylol, isomers and mixtures of isomers of cyclohexane bis(methylamine); triisopropanolamine; ethylene diamine; diethylene triamine; triethylene tetramine; tetraethylene pentamine; 4,4'-dicyclohexylmethane diamine; 2,2,4-trimethyl-1,6-hexanediamine; 2,4,4-trimethyl-1,6-hexanediamine; diethyleneglycol di-(aminopropyl)ether; 4,4'-bis-(sec-butylamino)-dicyclohexylmethane; 1,2-bis-(sec-butylamino)cyclohexane; 1,4-bis-(sec-butylamino)cyclohexane; isophorone diamine; hexamethylene diamine; propylene diamine; 1-methyl-2,4-cyclohexyl diamine; 1-methyl-2,6-cyclohexyl diamine; 1,3-diaminopropane; dimethylamino propylamine; diethylamino propylamine; imido-bis-propylamine; isomers and mixtures of isomers of diaminocyclohexane; monoethanolamine; diethanolamine; triethanolamine; monoisopropanolamine; and diisopropanolamine. The most preferred saturated curatives are 1,4-butanediol, 1,4-cyclohexyldimethylol and 4,4'-bis-(sec-butylamino)-dicyclohexylmethane.

The compositions of the invention may also be polyurea-based, which are distinctly different from polyurethane compositions, but also result in desirable aerodynamic and aesthetic characteristics when used in golf ball components. The polyurea-based compositions are preferably saturated in nature.

Without being bound to any particular theory, it is believed that substitution of the long chain polyol segment in the polyurethane prepolymer with a long chain polyamine oligomer soft segment to form a polyurea prepolymer, improves shear, cut, and resiliency, as well as adhesion to other components. Thus, the polyurea compositions of this invention may be formed from the reaction product of an isocyanate and polyamine prepolymer crosslinked with a curing agent. For example, polyurea-based compositions of the invention may be prepared from at least one isocyanate, at least one polyether amine, and at least one diol curing agent or at least one diamine curing agent.

Any polyamine available to one of ordinary skill in the art is suitable for use in the polyurea prepolymer. Polyether amines are particularly suitable for use in the prepolymer. As used herein, "polyether amines" refer to at least polyoxyalkyleneamines containing primary amino groups attached to the terminus of a polyether backbone. Due to the rapid reaction of isocyanate and amine, and the insolubility of many urea products, however, the selection of diamines and polyether amines is limited to those allowing the successful formation of the polyurea prepolymers. In one embodiment, the polyether backbone is based on tetramethylene, propylene, ethylene, trimethylolpropane, glycerin, and mixtures thereof.

Suitable polyether amines include, but are not limited to, methyldiethanolamine; polyoxyalkylenediamines such as, polytetramethylene ether diamines, polyoxypropylenetriamine, and polyoxypropylene diamines; poly(ethylene oxide capped oxypropylene) ether diamines; propylene oxide-based triamines; triethyleneglycoldiamines; trimethylolpropane-based triamines; glycerin-based triamines; and mixtures thereof. In one embodiment, the polyether amine used to form the prepolymer is JEFFAMINE® D2000 (manufactured by Huntsman Chemical Co. of Austin, Tex.).

The molecular weight of the polyether amine for use in the polyurea prepolymer may range from about 100 to about 5000, As used herein, the term "about" is used in connection with one or more numbers or numerical ranges, should be understood to refer to all such numbers, including all numbers in a range. In one embodiment, the polyether amine molecular weight is about 200 or greater, preferably about 230 or greater. In another embodiment, the molecular weight of the polyether amine is about 4000 or less. In yet another embodiment, the molecular weight of the polyether amine is about 600 or greater. In still another embodiment, the molecular weight of the polyether amine is about 3000 or less. In yet another embodiment, the molecular weight of the polyether amine is between about 1000 and about 3000, and more preferably is between about 1500 to about 2500. Because lower molecular weight polyether amines may be prone to forming solid polyureas, a higher molecular weight oligomer, such as Jeffamine D2000, is preferred.

As briefly discussed above, some amines may be unsuitable for reaction with the isocyanate because of the rapid reaction between the two components. In particular, shorter chain amines are fast reacting. In one embodiment, however, a hindered secondary diamine may be suitable for use in the prepolymer. Without being bound to any particular theory, it is believed that an amine with a high level of stearic hindrance, e.g., a tertiary butyl group on the nitrogen atom, has a slower reaction rate than an amine with no hindrance or a low level of hindrance. For example, 4,4'-bis-(sec-butylamino)-dicyclohexylmethane (CLEARLINK® 1000) may be suitable for use in combination with an isocyanate to form the polyurea prepolymer.

Any isocyanate available to one of ordinary skill in the art is suitable for use in the polyurea prepolymer. Isocyanates for use with the present invention include aliphatic, cycloaliphatic, araliphatic, aromatic, any derivatives thereof, and combinations of these compounds having two or more isocyanate (NCO) groups per molecule. The isocyanates may be organic polyisocyanate-terminated prepolymers. The isocyanate-containing reactable component may also include any isocyanate-functional monomer, dimer, trimer, or multimeric adduct thereof prepolymer, quasi-prepolymer, or mixtures thereof. Isocyanate-functional compounds may include monoisocyanates or polyisocyanates that include any isocyanate functionality of two or more.

Suitable isocyanate-containing components include diisocyanates having the generic structure: O=C=N—R—N=C=O, where R is preferably a cyclic, aromatic or linear or branched hydrocarbon moiety containing from about 1 to about 20 carbon atoms. The diisocyanate may also contain one or more cyclic groups or one or more phenyl groups. When multiple cyclic or aromatic groups are present, linear and/or branched hydrocarbons containing from about 1 to about 10 carbon atoms can be present as spacers between the cyclic or aromatic groups. In some cases, the cyclic or aromatic group(s) may be substituted at the 2-, 3-, and/or 4-positions, or at the ortho-, meta-, and/or para-positions, respectively. Substituted groups may include, but are not limited to, halogens, primary, secondary, or tertiary hydrocarbon groups, or a mixture thereof.

Examples of diisocyanates that can be used with the present invention include, but are not limited to, substituted and isomeric mixtures including 2,2'-, 2,4'-, and 4,4'-diphenylmethane diisocyanate (MDI); 3,3'-dimethyl-4,4'-biphenylene diisocyanate (TODI); toluene diisocyanate (TDI); polymeric MDI; carbodiimide-modified liquid 4,4'-diphenylmethane diisocyanate; para-phenylene diisocyanate (PPDI); meta-phenylene diisocyanate (MPDI); triphenyl methane-4, 4'- and triphenyl methane-4,4'-triisocyanate; naphthylene-1, 5-diisocyanate; 2,4'-, 4,4'-, and 2,2-biphenyl diisocyanate; polyphenyl polymethylene polyisocyanate (PMDI); mixtures of MDI and PMDI; mixtures of PMDI and TDI; ethylene diisocyanate; propylene-1,2-diisocyanate; tetramethylene-1, 2-diisocyanate; tetramethylene-1,3-diisocyanate; tetramethylene-1,4-diisocyanate; 1,6-hexamethylene-diisocyanate (HDI); octamethylene diisocyanate; decamethylene diisocyanate; 2,2,4-trimethylhexamethylene diisocyanate; 2,4,4-trimethylhexamethylene diisocyanate; dodecane-1,12-diisocyanate; cyclobutane-1,3-diisocyanate; cyclohexane-1,2-diisocyanate; cyclohexane-1,3-diisocyanate; cyclohexane-1,4-diisocyanate; methyl-cyclohexylene diisocyanate (HTDI); 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl) dicyclohexane; 2,4'-bis(isocyanatomethyl) dicyclohexane; isophorone diisocyanate (IPDI); triisocyanate of HDI; triisocyanate of 2,2,4-trimethyl-1,6-hexane diisocyanate (TMDI); 4,4'-dicyclohexylmethane diisocyanate ($H_{12}$MDI); 2,4-hexahydrotoluene diisocyanate; 2,6-hexahydrotoluene diisocyanate; 1,2-, 1,3-, and 1,4-phenylene diisocyanate; aromatic aliphatic isocyanate, such as 1,2-, 1,3-, and 1,4-xylene diisocyanate; meta-tetramethylxylene diisocyanate (m-TMXDI); para-tetramethylxylene diisocyanate (p-TMXDI); trimerized isocyanurate of any polyisocyanate, such as isocyanurate of toluene diisocyanate, trimer of diphenylmethane diisocyanate, trimer of tetramethylxylene diisocyanate, isocyanurate of hexamethylene diisocyanate, isocyanurate of isophorone diisocyanate, and mixtures thereof; dimerized uretdione of any polyisocyanate, such as uretdione of toluene diisocyanate, uretdione of hexamethylene diisocyanate, and mixtures thereof; modified polyisocyanate derived from the above isocyanates and polyisocyanates; and mixtures thereof.

Examples of saturated diisocyanates that can be used with the present invention include, but are not limited to, ethylene diisocyanate; propylene-1,2-diisocyanate; tetramethylene diisocyanate; tetramethylene-1,4-diisocyanate; 1,6-hexamethylene-diisocyanate (HDI); octamethylene diisocyanate; decamethylene diisocyanate; 2,2,4-trimethylhexamethylene diisocyanate; 2,4,4-trimethylhexamethylene diisocyanate; dodecane-1,12-diisocyanate; cyclobutane-1,3-diisocyanate; cyclohexane-1,2-diisocyanate; cyclohexane-1,3-diisocyanate; cyclohexane-1,4-diisocyanate; methyl-cyclohexylene diisocyanate (HTDI); 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl) dicyclohexane; 2,4'-bis(isocyanatomethyl) dicyclohexane; isophorone diisocyanate (IPDI); triisocyanate of HDI; triisocyanate of 2,2,4-trimethyl-1,6-hexane diisocyanate (TMDI); 4,4'-dicyclohexylmethane diisocyanate ($H_{12}$MDI); 2,4-hexahydrotoluene diisocyanate; 2,6-hexahydrotoluene diisocyanate; and mixtures thereof. Aromatic aliphatic isocyanates may also be used to form light stable materials. Examples of such isocyanates include 1,2-, 1,3-, and 1,4-xylene diisocyanate; meta-tetramethylxylene diisocyanate (m-TMXDI); para-tetramethylxylene diisocyanate (p-TMXDI); trimerized isocyanurate of any polyisocyanate, such as isocyanurate of toluene diisocyanate, trimer of diphenylmethane diisocyanate, trimer of tetramethylxylene diisocyanate, isocyanurate of hexamethylene diisocyanate, isocyanurate of isophorone diisocyanate, and mixtures thereof; dimerized uretdione of any polyisocyanate, such as uretdione of toluene diisocyanate, uretdione of hexamethylene diisocyanate, and mixtures thereof; modified polyisocyanate derived from the above isocyanates and polyisocyanates; and mixtures thereof. In addition, the aromatic aliphatic isocyanates may be mixed with any of the saturated isocyanates listed above for the purposes of this invention.

The number of unreacted NCO groups in the polyurea prepolymer of isocyanate and polyether amine may be varied to control such factors as the speed of the reaction, the resultant hardness of the composition, and the like. For instance, the number of unreacted NCO groups in the polyurea prepolymer of isocyanate and polyether amine may be less than about 14 percent. In one embodiment, the polyurea prepolymer has from about 5 percent to about 11 percent unreacted NCO groups, and even more preferably has from about 6 to about 9.5 percent unreacted NCO groups. In one embodiment, the percentage of unreacted NCO groups is about 3 percent to about 9 percent. Alternatively, the percentage of unreacted NCO groups in the polyurea prepolymer may be about 7.5 percent or less, and more preferably, about 7 percent or less. In another embodiment, the unreacted NCO content is from about 2.5 percent to about 7.5 percent, and more preferably from about 4 percent to about 6.5 percent.

When formed, polyurea prepolymers may contain about 10 percent to about 20 percent by weight of the prepolymer of free isocyanate monomer. Thus, in one embodiment, the polyurea prepolymer may be stripped of the free isocyanate monomer. For example, after stripping, the prepolymer may contain about 1 percent or less free isocyanate monomer. In another embodiment, the prepolymer contains about 0.5 percent by weight or less of free isocyanate monomer.

The polyether amine may be blended with additional polyols to formulate copolymers that are reacted with excess isocyanate to form the polyurea prepolymer. In one embodiment, less than about 30 percent polyol by weight of the copolymer is blended with the saturated polyether amine. In another embodiment, less than about 20 percent polyol by weight of the copolymer, preferably less than about 15 percent by weight of the copolymer, is blended with the polyether amine. The polyols listed above with respect to the polyurethane prepolymer, e.g., polyether polyols, polycaprolactone polyols, polyester polyols, polycarbonate polyols, hydrocarbon polyols, other polyols, and mixtures thereof, are also suitable for blending with the polyether amine. The molecular weight of these polymers may be from about 200 to about 4000, but also may be from about 1000 to about 3000, and more preferably are from about 1500 to about 2500.

The polyurea composition can be formed by crosslinking the polyurea prepolymer with a single curing agent or a blend of curing agents. The curing agent of the invention is preferably an amine-terminated curing agent, more preferably a secondary diamine curing agent so that the composition contains only urea linkages. In one embodiment, the amine-terminated curing agent may have a molecular weight of about 64 or greater. In another embodiment, the molecular weight of the amine-curing agent is about 2000 or less. As discussed above, certain amine-terminated curing agents may be modified with a compatible amine-terminated freezing point depressing agent or mixture of compatible freezing point depressing agents.

Suitable amine-terminated curing agents include, but are not limited to, ethylene diamine; hexamethylene diamine; 1-methyl-2,6-cyclohexyl diamine; tetrahydroxypropylene ethylene diamine; 2,2,4- and 2,4,4-trimethyl-1,6-hexanediamine; 4,4'-bis-(sec-butylamino)-dicyclohexylmethane; 1,4-bis-(sec-butylamino)-cyclohexane; 1,2-bis-(sec-butylamino)-cyclohexane; derivatives of 4,4'-bis-(sec-butylamino)-dicyclohexylmethane; 4,4'-dicyclohexylmethane diamine; 1,4-cyclohexane-bis-(methylamine); 1,3-cyclohexane-bis-(methylamine); diethylene glycol di-(aminopropyl) ether; 2-methylpentam-ethylene-diamine; diaminocyclohexane; diethylene triamine; triethylene tetramine; tetraethylene pentamine; propylene diamine; 1,3-diaminopropane; dimethylamino propylamine; diethylamino propylamine; dipropylene triamine; imido-bis-propylamine; monoethanolamine, diethanolamine; triethanolamine; monoisopropanolamine, diisopropanolamine; isophoronediamine; 4,4'-methylenebis-(2-chloroaniline); 3,5; dimethylthio-2,4-toluenediamine; 3,5-dimethylthio-2,6-toluenediamine; 3,5-diethylthio-2,4-toluenediamine; 3,5; diethylthio-2,6-toluenediamine; 4,4'-bis-(sec-butylamino)-diphenylmethane and derivatives thereof; 1,4-bis-(sec-butylamino)-benzene; 1,2-bis-(sec-butylamino)-benzene; N,N'-dialkylamino-diphenylmethane; N,N,N',N'-tetrakis (2-hydroxypropyl) ethylene diamine; trimethyleneglycol-di-p-aminobenzoate; polytetramethyleneoxide-di-p-aminobenzoate; 4,4'-methylenebis-(3-chloro-2,6-diethyleneaniline); 4,4'-methylenebis-(2,6-diethylaniline); meta-phenylenediamine; paraphenylenediamine; and mixtures thereof. In one embodiment, the amine-terminated curing agent is 4,4'-bis-(sec-butylamino)-dicyclohexylmethane.

Suitable saturated amine-terminated curing agents include, but are not limited to, ethylene diamine; hexamethylene diamine; 1-methyl-2,6-cyclohexyl diamine; tetrahydroxypropylene ethylene diamine; 2,2,4- and 2,4,4-trimethyl-1,6-hexanediamine; 4,4'-bis-(sec-butylamino)-dicyclohexylmethane; 1,4-bis-(sec-butylamino)-cyclohexane; 1,2-bis-(sec-butylamino)-cyclohexane; derivatives of 4,4'-bis-(sec-butylamino)-dicyclohexylmethane; 4,4'-dicyclohexylmethane diamine; 4,4'-methylenebis-(2,6-diethylaminocyclohexane; 1,4-cyclohexane-bis-(methylamine); 1,3-cyclohexane-bis-(methylamine); diethylene glycol di-(aminopropyl) ether; 2-methylpentam-ethylene-diamine; diaminocyclohexane; diethylene triamine; triethylene tetramine; tetraethylene pentamine; propylene diamine; 1,3-diaminopropane; dimethylamino propylamine; diethyl amino propylamine; imido-bis-propylamine; monoethanolamine, diethanolamine; triethanolamine; monoisopropanolamine, diisopropanolamine; isophoronediamine; triisopropanolamine; and mixtures thereof. In addition, any of the polyether amines listed above may be used as curing agents to react with the polyurea prepolymers.

Suitable catalysts include, but are not limited to bismuth catalyst, oleic acid, triethylenediamine (DABCO®-33LV), di-butyltin dilaurate (DABCO®-T12) and acetic acid. The most preferred catalyst is di-butyltin dilaurate (DABCO®-T12). DABCO® materials are manufactured by Air Products and Chemicals, Inc.

Thermoplastic materials may be blended with other thermoplastic materials, but thermosetting materials are difficult if not impossible to blend homogeneously after the thermosetting materials are formed. Preferably, the saturated polyurethane comprises from about 1% to about 100%, more preferably from about 10% to about 75% of the cover composition and/or the intermediate layer composition. About 90% to about 10%, more preferably from about 90% to about 25% of the cover and/or the intermediate layer composition is comprised of one or more other polymers and/or other materials as described below. Such polymers include, but are not limited to polyurethane/polyurea ionomers, polyurethanes or polyureas, epoxy resins, polyethylenes, polyamides and polyesters, polycarbonates and polyacrylin. Unless otherwise stated herein, all percentages are given in percent by weight of the total composition of the golf ball layer in question.

Polyurethane prepolymers are produced by combining at least one polyol, such as a polyether, polycaprolactone, polycarbonate or a polyester, and at least one isocyanate. Thermosetting polyurethanes are obtained by curing at least one polyurethane prepolymer with a curing agent selected from a polyamine, triol or tetraol. Thermoplastic polyurethanes are obtained by curing at least one polyurethane prepolymer with a diol curing agent. The choice of the curatives is critical because some urethane elastomers that are cured with a diol and/or blends of diols do not produce urethane elastomers with the impact resistance required in a golf ball cover. Blending the polyamine curatives with diol cured urethane elastomeric formulations leads to the production of thermoset urethanes with improved impact and cut resistance.

Thermoplastic polyurethanes may be blended with suitable materials to produce a thermoplastic end product. Examples of such additional materials may include ionomers such as the SURLYN®, ESCOR® and IOTEK® copolymers described above.

Other suitable materials which may be combined with the saturated polyurethanes in forming the cover and/or intermediate layer(s) of the golf balls of the invention include ionic or non-ionic polyurethanes and polyureas, epoxy resins, polyethylenes, polyamides and polyesters. For example, the cover and/or intermediate layer may be formed from a blend of at least one saturated polyurethane and thermoplastic or thermoset ionic and non-ionic urethanes and polyurethanes, cationic urethane ionomers and urethane epoxies, ionic and non-ionic polyureas and blends thereof. Examples of suitable urethane ionomers are disclosed in U.S. Pat. No. 5,692,974 entitled "Golf Ball Covers", the disclosure of which is hereby incorporated by reference in its entirety. Other examples of suitable polyurethanes are described in U.S. Pat. No. 5,334,673. Examples of appropriate polyureas are discussed in U.S. Pat. No. 5,484,870 and examples of suitable polyurethanes cured with epoxy group containing curing agents are disclosed in U.S. Pat. No. 5,908,358, the disclosures of which are hereby incorporated herein by reference in their entirety.

A variety of conventional components can be added to the cover compositions of the present invention. These include, but are not limited to, white pigment such as $TiO_2$, ZnO, optical brighteners, surfactants, processing aids, foaming agents, density-controlling fillers, UV stabilizers and light stabilizers. Saturated polyurethanes are resistant to discoloration. However, they are not immune to deterioration in their mechanical properties upon weathering. Addition of UV absorbers and light stabilizers therefore helps to maintain the tensile strength and elongation of the saturated polyurethane elastomers. Suitable UV absorbers and light stabilizers include TINUVIN® 328, TINUVIN® 213, TINUVIN® 765, TINUVIN® 770 and TINUVIN® 622. The preferred UV absorber is TINUVIN® 328, and the preferred light stabilizer is TINUVIN® 765. TINUVIN® products are available from Ciba-Geigy. Dyes, as well as optical brighteners and fluorescent pigments may also be included in the golf ball covers produced with polymers formed according to the present invention. Such additional ingredients may be added in any amounts that will achieve their desired purpose.

Any method known to one of ordinary skill in the art may be used to form the aforementioned polyurethanes. One commonly employed method, known in the art as a one-shot method, involves concurrent mixing of the polyisocyanate, polyol, and curing agent. This method results in a mixture that is inhomogeneous (more random) and affords the manufacturer less control over the molecular structure of the resultant composition. A preferred method of mixing is known as a prepolymer method. In this method, the polyisocyanate and the polyol are mixed separately prior to addition of the curing agent. This method affords a more homogeneous mixture resulting in a more consistent polymer composition. Other methods suitable for forming the layers of the present invention include reaction injection molding ("RIM"), liquid injection molding ("LIM"), and pre-reacting the components to form an injection moldable thermoplastic polyurethane and then injection molding, all of which are known to one of ordinary skill in the art.

Additional components which can be added to the polyurethane composition include UV stabilizers and other dyes, as well as optical brighteners and fluorescent pigments and dyes. Such additional ingredients may be added in any amounts that will achieve their desired purpose.

It has been found by the present invention that the use of a castable, reactive material, which is applied in a fluid form, makes it possible to obtain very thin outer cover layers on golf balls. Specifically, it has been found that castable, reactive liquids, which react to form a urethane elastomer material, provide desirable very thin outer cover layers.

The castable, reactive liquid employed to form the urethane elastomer material can be applied over the core using a variety of application techniques such as spraying, dipping, spin coating, or flow coating methods which are well known in the art. An example of a suitable coating technique is that which is disclosed in U.S. Pat. No. 5,733,428, the disclosure of which is hereby incorporated by reference in its entirety.

The outer cover is preferably formed around the inner cover by mixing and introducing the material in the mold halves. It is important that the viscosity be measured over time, so that the subsequent steps of filling each mold half, introducing the core into one half and closing the mold can be properly timed for accomplishing centering of the core cover halves fusion and achieving overall uniformity. Suitable viscosity range of the curing urethane mix for introducing cores into the mold halves is determined to be approximately between about 2,000 cP and about 30,000 cP, with the preferred range of about 8,000 cP to about 15,000 cP.

To start the cover formation, mixing of the prepolymer and curative is accomplished in motorized mixer including mixing head by feeding through lines metered amounts of curative and prepolymer. Top preheated mold halves are filled and placed in fixture units using centering pins moving into holes in each mold. At a later time, a bottom mold half or a series of bottom mold halves have similar mixture amounts introduced into the cavity. After the reacting materials have resided in top mold halves for about 40 to about 80 seconds, a core is lowered at a controlled speed into the gelling reacting mixture.

A ball cup holds the ball core through reduced pressure (or partial vacuum). Upon location of the coated core in the halves of the mold after gelling for about 40 to about 80 seconds, the vacuum is released allowing core to be released. The mold halves, with core and solidified cover half thereon, are removed from the centering fixture unit, inverted and mated with other mold halves which, at an appropriate time earlier, have had a selected quantity of reacting polyurethane prepolymer and curing agent introduced therein to commence gelling.

Similarly, U.S. Pat. No. 5,006,297 to Brown et al. and U.S. Pat. No. 5,334,673 to Wu both also disclose suitable molding techniques which may be utilized to apply the castable reactive liquids employed in the present invention. Further, U.S. Pat. Nos. 6,180,040 and 6,180,722 disclose methods of preparing dual core golf balls. The disclosures of these patents are hereby incorporated by reference in their entirety. However, the method of the invention is not limited to the use of these techniques.

Depending on the desired properties, balls prepared according to the invention can exhibit substantially the same or higher resilience, or coefficient of restitution ("COR"), with a decrease in compression or modulus, compared to balls of conventional construction. Additionally, balls prepared according to the invention can also exhibit substantially higher resilience, or COR, without an increase in compression, compared to balls of conventional construction. Another measure of this resilience is the "loss tangent," or tan δ, which is obtained when measuring the dynamic stiffness of an object. Loss tangent and terminology relating to such dynamic properties is typically described according to ASTM D4092-90. Thus, a lower loss tangent indicates a higher resiliency, thereby indicating a higher rebound capacity. Low loss tangent indicates that most of the energy imparted to a golf ball from the club is converted to dynamic energy, i.e., launch velocity and resulting longer distance. The rigidity or compressive stiffness of a golf ball may be measured, for example, by the dynamic stiffness. A higher dynamic stiffness indicates a higher compressive stiffness. To produce golf balls having a desirable compressive stiffness, the dynamic stiffness of the crosslinked reaction product material should be less than about 50,000 N/m at −50° C. Preferably, the dynamic stiffness should be between about 10,000 and 40,000 N/m at −50° C., more preferably, the dynamic stiffness should be between about 20,000 and 30,000 N/m at −50° C.

The coefficient of restitution ("COR") is a measurement of the collision between the ball and a relatively larger mass. One conventional technique for measuring COR uses a golf ball or golf ball subassembly, air cannon, and a stationary vertical steel plate. The steel plate provides an impact surface weighing about 100 pounds or about 45 kilograms. A pair of ballistic light screens are spaced apart and located between the air cannon and the steel plate. The ball is fired from the air cannon toward the steel plate over a range of test velocities from 50 ft/sec to 180 ft/sec. Unless noted otherwise, all COR data presented in this application are measured using a speed of 125 ft/sec. As the ball travels toward the steel plate, it activates each light screen so that the time at each light screen is measured. This provides an incoming time period proportional to the ball's incoming velocity. The ball impacts the steel plate and rebounds though the light screens, which again measure the time period required to transit between the light screens. This provides an outgoing transit time period proportional to the ball's outgoing velocity. The COR can be calculated by the ratio of the outgoing transit time period to the incoming transit time period.

Coefficient of restitution of the material may be defined as the COR of a sphere between 0.25 inch to 1.68 inch, preferably between 1.00 inch to 1.62 and more preferably between 1.30 inch to 1.60 inch molded of that material and that sphere is tested for COR as discussed above. The COR of the material can also be measured on a plaque, button, or slab of material such as bayshore resilience, tan delta via dynamic mechanical analysis. A method of measuring coefficient of restitution is described in commonly-owned U.S. patent application Ser. No. 10/914,289, which is incorporated herein by reference in its entirety. At 125 ft/sec, the coefficient of restitution of the materials according to this invention, as defined in COR values, may be in the range of about 0.500 to about 0.900, preferably about 0.700 to about 0.875, and more preferably about 0.750 to about 0.850. The COR of the material used to create a layer (core, outer core, inner or outer cover, etc.) is then "extrapolated" or otherwise standardized to the COR of standard spheres, and the same equations used for the composite subassemblies, discussed above, are used for "material COR".

Compression is an important factor in golf ball design, e.g. the compression of the core determines the ball's spin rate off the driver and the feel. Several different methods have been used to measure compression, including Atti compression, Riehle compression, load/deflection measurements at a variety of fixed loads and offsets, and the effective modulus. See Jeff Dalton, Compression by Any Other Name, Science and Golf IV, Proceedings of the World Scientific Congress of Golf (Eric Thain ed., Routledge, 2002) ("J. Dalton"). The conversions from the Atti compression to Riehle (cores), Riehle (balls), 100 kg deflection, 130-10 kg deflection or effective modulus can be carried out according to the formulas given in J. Dalton. Likewise, the golf balls of this invention are not constrained to a particular progression of flexural modulus, hardness or compression. Coating or paint layers on the balls' dimpled surface are not considered as pieces or layers of the constructions discussed herein.

The molding process and composition of golf ball portions can result in a gradient of material properties. Methods employed in the prior art generally exploit hardness to quantify these gradients. Hardness is a qualitative measure of static modulus and does not represent the modulus of the material at the deformation rates associated with golf ball use, i.e., impact by a club. As is well known to one skilled in the art of polymer science, the time-temperature superposition principle may be used to emulate alternative deformation rates. For golf ball portions including polybutadiene, a 1-Hz oscillation at temperatures between 0° C. and −50° C. are believed to be qualitatively equivalent to golf ball impact rates. Therefore, measurement of loss tangent and dynamic stiffness at 0° C. to −50° C. may be used to accurately anticipate golf ball performance, preferably at temperatures between about −20° C. and −50° C.

In another embodiment of the present invention, a golf ball of the present invention is substantially spherical and has a cover with a plurality of dimples formed on the outer surface thereof.

U.S. application Ser. No. 10/230,015, now U.S. Publication No. 2003/0114565, and U.S. application Ser. No. 10/108,793, now U.S. Publication No. 2003/0050373, which are incorporated by reference herein in their entirety, discuss soft, high resilient ionomers, which are preferably from neutralizing the acid copolymer(s) of at least one E/X/Y copolymer, where E is ethylene, X is the α,β-ethylenically unsaturated carboxylic acid, and Y is a softening co-monomer. X is preferably present in 2-30 (preferably 4-20, most preferably 5-15) wt. % of the polymer, and Y is preferably present in 17-40 (preferably 20-40, and more preferably 24-35) wt. % of the polymer. Preferably, the melt index (MI) of the base resin is at least 20, or at least 40, more preferably, at least 75 and most preferably at least 150. Particular soft, resilient ionomers included in this invention are partially neutralized ethylene/(meth) acrylic acid/butyl (meth) acrylate copolymers having an MI and level of neutralization that results in a melt processable polymer that has useful physical properties. The copolymers are at least partially neutralized. Preferably at least 40, or, more preferably at least 55, even more preferably about 70, and most preferably about 80 of the acid moiety of the acid copolymer is neutralized by one or more alkali metal, transition metal, or alkaline earth metal cations. Cations useful in making the ionomers of this invention comprise lithium, sodium, potassium, magnesium, calcium, barium, or zinc, or a combination of such cations.

Additional optional additives useful in the practice of the subject invention include acid copolymer wax (e.g., Allied wax AC 143 believed to be an ethylene/16-18% acrylic acid copolymer with a number average molecular weight of 2,040), which assist in preventing reaction between the filler materials (e.g., ZnO) and the acid moiety in the ethylene copolymer. Other optional additives include $TiO_2$, which is used as a whitening agent; optical brighteners; surfactants; processing aids; etc.

Ionomers may be blended with conventional ionomeric copolymers (di-, ter-, etc.), using well-known techniques, to manipulate product properties as desired. The blends would still exhibit lower hardness and higher resilience when compared with blends based on conventional ionomers.

Also, ionomers can be blended with non-ionic thermoplastic resins to manipulate product properties. The non-ionic thermoplastic resins would, by way of non-limiting illustrative examples, include thermoplastic elastomers, such as polyurethane, poly-ether-ester, poly-amide-ether, polyether-urea, PEBAX® (a family of block copolymers based on poly-ether-block-amide, commercially supplied by Atochem), styrene-butadiene-styrene (SBS) block copolymers, styrene (ethylene-butylene)-styrene block copolymers, etc., polyamides (oligomeric and polymeric), polyesters, polyolefins including PE, PP, E/P copolymers, etc., ethylene copolymers with various comonomers, such as vinyl acetate, (meth) acrylates, (meth)acrylic acid, epoxy-functionalized monomer, CO, etc., functionalized polymers with maleic anhydride grafting, epoxidization etc., elastomers, such as EPDM, metallocene catalyzed PE and copolymer, ground up powders of the thermoset elastomers, etc. Such thermoplastic blends comprise about 1% to about 99% by weight of a first thermoplastic and about 99% to about 1% by weight of a second thermoplastic.

Additionally, the compositions of U.S. application Ser. No. 10/269,341, now U.S. Publication No. 2003/0130434, and U.S. Pat. No. 6,653,382, both of which are incorporated herein in their entirety, discuss compositions having high COR when formed into solid spheres.

The cover can be selected from conventional materials used as golf ball covers based on the desired performance characteristics. The cover may be comprised of one or more layers. Cover materials such as ionomer resins, blends of ionomer resins, thermoplastic or thermoset urethanes, and balata, can be used as known in the art and discussed above. In other embodiments, additional layers may be added to those mentioned above or the existing layers may be formed by multiple materials.

When golf balls are prepared according to the invention, they typically will have dimple coverage greater than about 60 percent, preferably greater than about 65 percent, and more preferably greater than about 75 percent. The flexural modulus of the cover on the golf balls, as measured by ASTM method D6272-98, Procedure B, is typically greater than about 500 psi, and is preferably from about 500 psi to 150,000 psi. As discussed herein, the outer cover layer is preferably formed from a relatively soft polyurethane material. In particular, the material of the outer cover layer should have a material hardness, as measured by ASTM-D2240, less than about 45 Shore D, preferably less than about 40 Shore D, more preferably between about 25 and about 40 Shore D, and most preferably between about 30 and about 40 Shore D. The casing preferably has a material hardness of less than about 70 Shore D, more preferably between about 30 and about 70 Shore D, and most preferably, between about 50 and about 65 Shore D.

The present multilayer golf ball can have an overall diameter of any size. Although the United States Golf Association ("USGA") specifications limit the minimum size of a competition golf ball to 1.680 inches. There is no specification as to the maximum diameter. Golf balls of any size, however, can be used for recreational play. The preferred diameter of the present golf balls is from about 1.680 inches to about 1.800 inches. The more preferred diameter is from about 1.680 inches to about 1.760 inches. The most preferred diameter is about 1.680 inches to about 1.740 inches.

The golf balls of the present invention should have a moment of inertia ("MOI") of less than about 85 kg·m² (or g·mm²) and, preferably, less than about 83 kg·m² (or g·mm²). The MOI is typically measured on model number MOI-005-104 Moment of Inertia Instrument manufactured by Inertia Dynamics of Collinsville, Conn. The instrument is plugged into a PC for communication via a COMM port and is driven by MOI Instrument Software version #1.2.

U.S. Pat. Nos. 6,193,619; 6,207,784; and 6,221,960, and U.S. application Ser. No. 09/594,031, filed Jun. 15, 2000; Ser. No. 09/677,871, filed Oct. 3, 2000, and Ser. No. 09/447,652, filed Nov. 23, 1999, are incorporated in their entirety herein by express reference thereto.

Unless otherwise expressly specified, all of the numerical ranges, amounts, values and percentages such as those for amounts of materials, and others in the specification may be read as if prefaced by the word "about" even though the term "about" may not expressly appear with the value, amount or range. Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

While it is apparent that the illustrative embodiments of the invention disclosed herein fulfill the preferred embodiments of the present invention, it is appreciated that numerous modifications and other embodiments may be devised by those skilled in the art. Examples of such modifications include slight variations of the numerical values discussed above. Hence, the numerical values stated above and claimed below specifically include those values and the values that are approximately or nearly close to the stated and claimed values. Therefore, it will be understood that the appended claims are intended to cover all such modifications and embodiments, which would come within the spirit and scope of the present invention.

The invention claimed is:

1. A multilayer golf ball comprising:
a core comprising at least three core layers comprising a center, an inner core layer, and an outer core layer;
at least one cover layer; and
at least one moisture vapor barrier layer comprising a locally curable material selected from the group comprising butyl rubber, polysulfide rubber, a single-pack castable polymer comprising uretdione, a single-pack castable polymer comprising isocyanate and an amine, and a single-pack castable polymer comprising isocyanate and a polyol intermediate between the outer core layer and the at least one cover layer and exhibiting a moisture vapor transmission rate less than that of the cover layer;
wherein the center, the inner core layer, and the outer core layer exhibit a hardness gradient,
wherein the hardness gradient increases toward the at least one intermediate vapor barrier layer, and wherein:
the center hardness is no more than about 50 Shore C;
the inner core hardness is greater than about 50 Shore C;
the outer core hardness is greater than about 65 Shore C; or
a combination thereof.

2. The multilayer golf ball of claim 1, wherein the thickness of the at least one vapor barrier layer is relatively uniform and is not more than about 0.020 inch.

3. The multilayer golf ball of claim 1, wherein the at least one vapor barrier layer comprises a thermoplastic elastomeric binder and a particulate material that has a low moisture vapor transmission rate.

4. The multilayer golf ball of claim 1, comprising a moment of inertia of less than about 85 kg·m².

5. The multilayer golf ball of claim 1, comprising a coefficient of restitution of greater than about 0.7.

6. The multilayer golf ball of claim 1, comprising an atti compression of at least about 40.

7. A multilayer golf ball comprising:
a core comprising at least three core layers comprising a center, an inner core layer, and an outer core layer;
at least one cover layer; and
at least one moisture vapor barrier layer comprising a locally curable material selected from the group comprising butyl rubber, polysulfide rubber, single-pack castable polymers comprising uretdione, single-pack castable polymers comprising isocyanate and an amine, and single-pack castable polymers comprising isocyanate and a polyol intermediate between the outer core layer and the at least one cover layer and exhibiting a moisture vapor transmission rate less than that of the cover layer wherein the center, the inner core layer, and the outer core layer exhibit a hardness gradient, wherein:
the center has
a diameter from about 0.5 inch to about 1.6 inches,
a Mooney viscosity greater than about 35,
a deflection under a load of about 100 kg of at least about 1 mm,
a zinc diacrylate content from about 10 to about 40 parts per hundred parts of rubber,
or some combination thereof;
the inner core layer has an outer diameter of not more than about 1.610 inches,
a Mooney viscosity greater than about 35,
a zinc diacrylate content from about 15 to about 45 parts per hundred parts of rubber, or
some combination thereof; and
the outer core layer has
an outer diameter of not more than about 1.660 inches,
a Mooney viscosity greater than about 35,
a zinc diacrylate content from about 15 to about 45 parts per hundred parts of rubber, or
some combination thereof.

8. A multilayer golf ball comprising:
a core comprising at least three core layers comprising a center, an inner core layer, and an outer core layer;

at least one cover layer; and at least one moisture vapor barrier layer comprising a locally curable material selected from the group comprising butyl rubber, polysulfide rubber, single-pack castable polymers comprising uretdione, single-pack castable polymers comprising isocyanate and an amine, and single-pack castable polymers comprising isocyanate and a polyol intermediate between the outer core layer and the at least one cover layer and exhibiting a moisture vapor transmission rate less than that of the cover layer, wherein the center, the inner core layer, and the outer core layer exhibit a hardness gradient, wherein the at least one vapor barrier layer comprises a thermoplastic elastomeric binder and a particulate material that has a low moisture vapor transmission rate, wherein the thermoplastic elastomeric binder comprises a styrene-diene block copolymer or a styrene-hydrogenated diene block copolymer.

9. A multilayer golf ball comprising:

at least three core layers comprising a center, an inner core layer, and an outer core layer;

at least one cover layer; and at least one vapor barrier layer comprising a locally curable material selected from the group comprising butyl rubber, polysulfide rubber, single-pack castable polymers comprising uretdione, single-pack castable polymers comprising isocyanate and an amine, and single-pack castable polymers comprising isocyanate and a polyol intermediate between the outer core layer and the at least one cover layer and exhibiting a moisture vapor transmission rate less than that of the cover layer, wherein the center, the inner core layer, and the outer core layer exhibit a hardness gradient, wherein the at least one vapor barrier layer comprises a thermoplastic elastomeric binder and a particulate material that has a low moisture vapor transmission rate, wherein the particulate material comprises an aluminum flake material.

10. The multilayer golf ball of claim 9, wherein the ratio of particulate material to binder material is about 1:1.

* * * * *